(12) United States Patent
An et al.

(10) Patent No.: US 10,725,225 B2
(45) Date of Patent: Jul. 28, 2020

(54) DISPLAY DEVICE

(71) Applicant: Samsung Display Co., Ltd., Yongin-si, Gyeonggi-do (KR)

(72) Inventors: Jae Sul An, Hwaseong-si (KR); Ji Won Lee, Suwon-si (KR); Sang Won Lee, Seoul (KR); Seung Beom Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 99 days.

(21) Appl. No.: 16/159,527

(22) Filed: Oct. 12, 2018

(65) Prior Publication Data

US 2019/0187355 A1 Jun. 20, 2019

(30) Foreign Application Priority Data

Dec. 20, 2017 (KR) ........................ 10-2017-0175971

(51) Int. Cl.
*G02F 1/1335* (2006.01)
*F21V 8/00* (2006.01)
*G09G 3/20* (2006.01)
*G02B 5/00* (2006.01)
*G02F 1/13357* (2006.01)
*G02F 1/1333* (2006.01)

(52) U.S. Cl.
CPC .......... *G02B 6/0026* (2013.01); *G02B 5/003* (2013.01); *G02F 1/133512* (2013.01); *G02F 1/133615* (2013.01); *G09G 3/2003* (2013.01); *G02F 2001/133388* (2013.01); *G02F 2001/133614* (2013.01)

(58) Field of Classification Search
None
See application file for complete search history.

(56) References Cited

U.S. PATENT DOCUMENTS

2018/0364408 A1\* 12/2018 Hwang ................ G02B 6/0031

FOREIGN PATENT DOCUMENTS

| KR | 2001-0096633 A | 11/2001 |
|---|---|---|
| KR | 10-0586173 B1 | 6/2006 |
| KR | 10-0587834 B1 | 6/2006 |
| KR | 10-1006838 B1 | 1/2011 |
| KR | 10-2012-0106304 A | 9/2012 |
| KR | 10-1444776 B1 | 9/2014 |
| KR | 10-2016-0011573 A | 2/2016 |

\* cited by examiner

*Primary Examiner* — Richard H Kim
(74) *Attorney, Agent, or Firm* — Lewis Roca Rothgerber Christie LLP

(57) ABSTRACT

A display device is provided. The display device includes a light source; an optical member including a light guide plate, which has a first side surface facing the light source, and a light transmission blocking pattern, which is disposed along an edge of an upper surface of the light guide plate to transmit ultraviolet light and block visible light; a display panel disposed on the optical member; and a light shielding resin disposed between the optical member and the display panel and configured to overlap the light transmission blocking pattern and couple the optical member with the display panel.

20 Claims, 30 Drawing Sheets

DISPLAY DEVICE

CROSS-REFERENCE TO RELATED APPLICATION

This application claims priority to and the benefit of Korean Patent Application No. 10-2017-0175971, filed on Dec. 20, 2017, in the Korean Intellectual Property Office, the content of which in its entirety is herein incorporated by reference.

BACKGROUND

1. Field

The present disclosure relates to a display device.

2. Description of the Related Art

In a non-emissive display device such as a liquid crystal display device, a display panel which generates an image does not emit light by itself, and generates an image using light provided from a backlight unit. The backlight unit includes a light source and a light guide plate for guiding the light emitted from the light source with surface light emission.

The backlight unit is disposed below the display panel, and the display panel and the backlight unit may be coupled to each other via a coupling member.

SUMMARY

Aspects of the present disclosure are directed toward a display device that is easy to manufacture and has improved display quality.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to embodiments of the present disclosure, it is possible to provide a display device that is easy to manufacture.

Further, according to embodiments of the present disclosure, it is possible to provide a display device with improved reliability.

Further, according to embodiments of the present disclosure, it is possible to provide a display device with improved display quality by preventing light leakage.

The effects of the present disclosure are not limited to the above-described effects and other effects which are not described herein will become apparent to those skilled in the art from the following description.

An embodiment may be related to a display device. The display device includes a light source; an optical member including a light guide plate, which has a first side surface facing the light source, and a light transmission blocking pattern, which is disposed along an edge of an upper surface of the light guide plate to transmit ultraviolet light and block visible light; a display panel disposed on the optical member; and a light shielding resin disposed between the optical member and the display panel and configured to overlap the light transmission blocking pattern and couple the optical member with the display panel.

An embodiment may be related to a display device. The display device includes a light source; an optical member including a light guide plate, which has a first side surface facing the light source, and a light transmission blocking pattern, which is disposed along an edge of an upper surface of the light guide plate and includes a light absorbing material or a light reflecting material; a display panel disposed on the optical member; and a light shielding resin disposed between the optical member and the display panel and configured to couple the optical member with the display panel, wherein a light transmission opening is arranged in the light transmission blocking pattern to overlap the light shielding resin.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
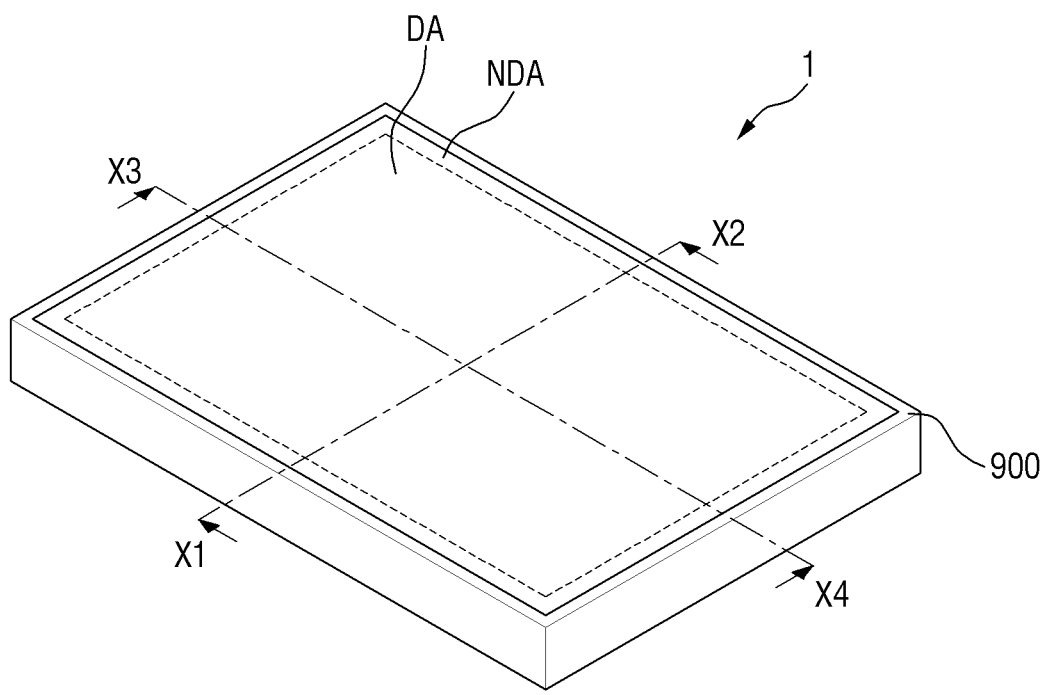
FIG. 1 is a perspective view of a display device according to an embodiment of the present disclosure.

Example embodiments are described with reference to the accompanying drawings. The example embodiments may be embodied in many different forms and should not be construed as being limited. Like reference numerals may refer to like elements in the description.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

When a first element is referred to as being "on", "connected to" or "coupled to" a second element or layer, the first element can be directly on, connected or coupled to the second element, or one or more intervening elements may be present between the first element and the second element. In contrast, when a first element is referred to as being "directly on", "directly connected to" or "directly coupled to" a second element or layer, there are no intended intervening elements (except environmental elements such as air) present between the first element and the second element. The term "and/or" may include any and all combinations of one or more of the associated items.

The use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively.

Hereinafter, embodiments will be described with reference to the accompanying drawings.

FIG. 1 is a perspective view of a display device according to an embodiment of the present disclosure.

Referring to FIG. 1, a display device 1 can be applied to various electronic apparatuses such as a central information display (CID) (provided on a tablet PC, a smart phone, a car navigation unit, a camera and/or an automobile), small- and medium-sized electronic equipment (such as a wristwatch type electronic device, a personal digital assistant (PDA) a portable multimedia player (PMP) and/or a game machine), and electronic equipment (such as a television, an external billboard, a monitor, a personal computer and/or a laptop computer). It should be understood that these are merely examples, and the present disclosure can be applied to other electronic apparatuses without departing from the concept of the present invention.

In some embodiments, the display device 1 may be rectangular in a plan view. The display device 1 may include both short sides extending in one direction and both long sides extending in the other direction crossing or intersecting the one direction. The edge where the long side and the short side of the display device 1 meet may have a right angle, but is not limited thereto, and may form a curved surface. The planar shape of the display device 1 is not limited to the illustrated one, and may be circular or other shapes.

The display device 1 may include a display area DA and a non-display area NDA, and may display an image through the display area DA.

Figure 2:
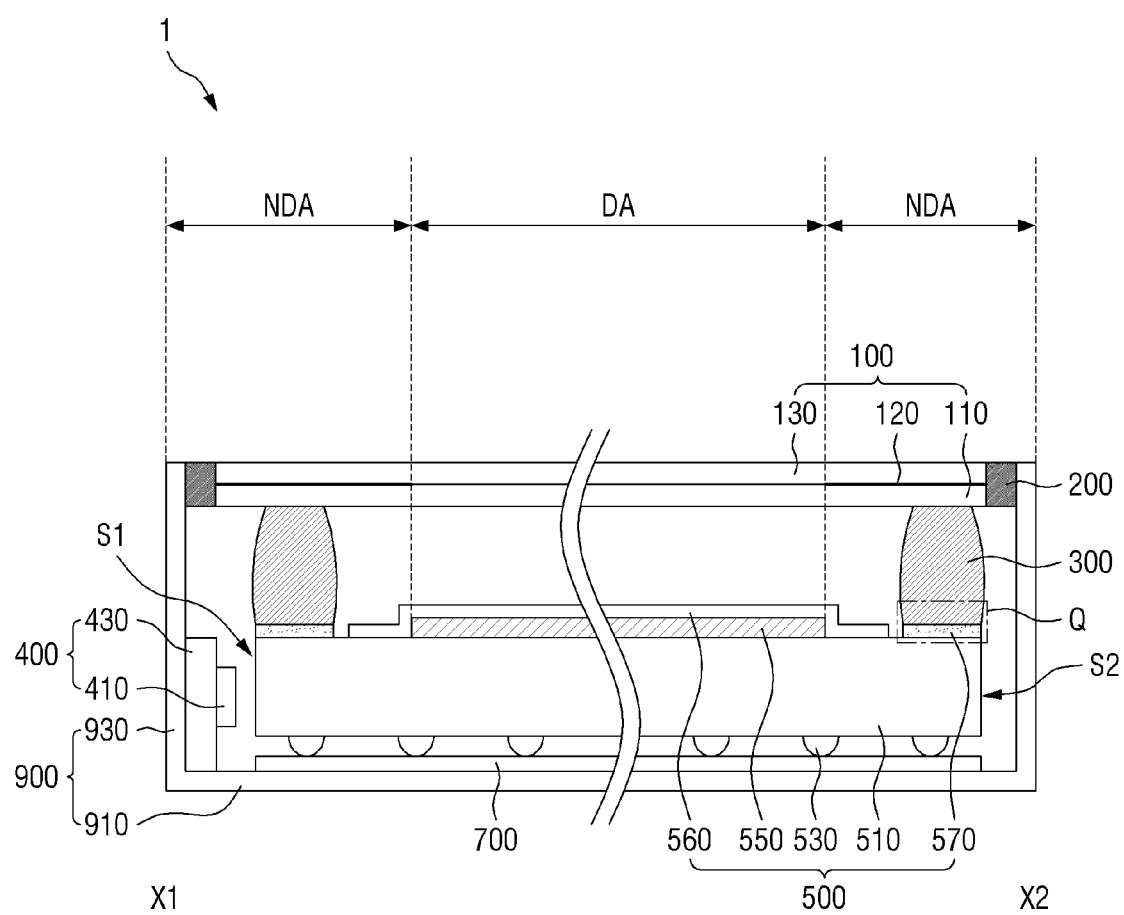
FIG. 2 is a cross-sectional view of the display device taken along line X1-X2 of FIG. 1.
Figure 3:
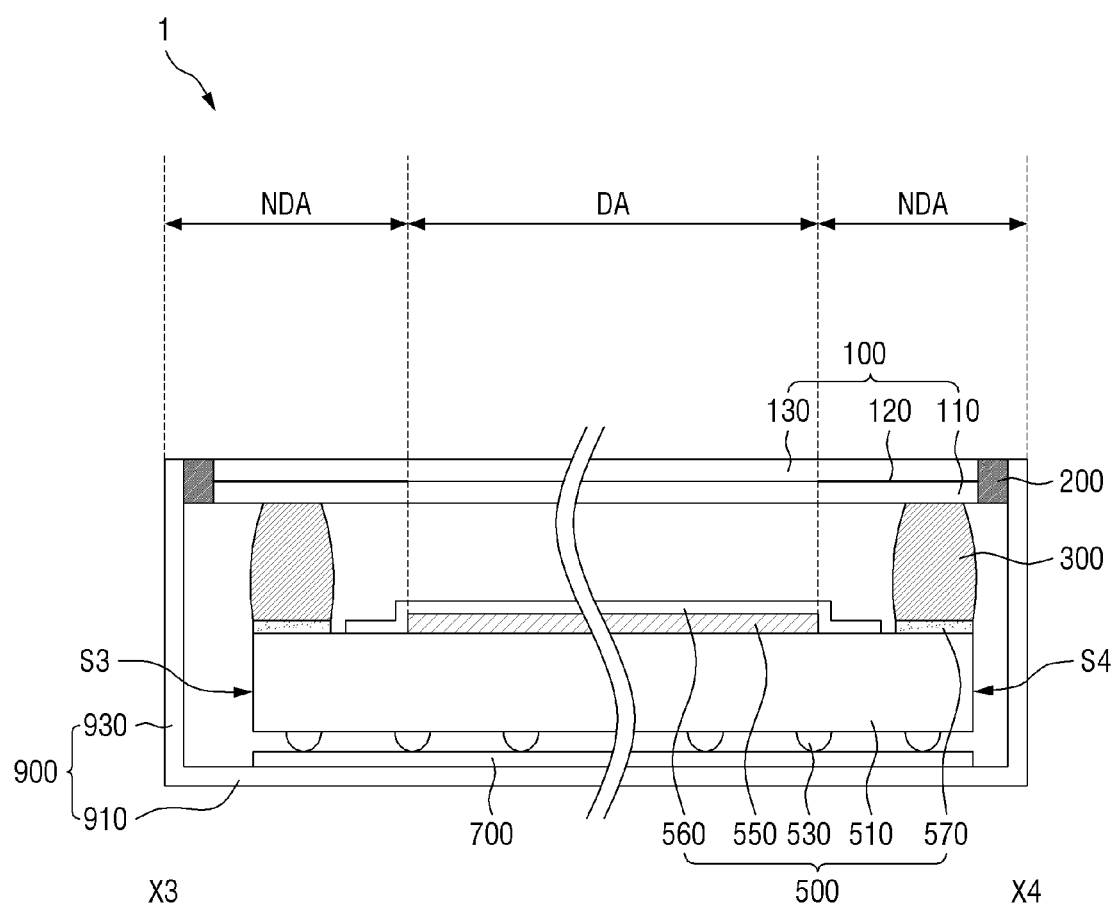
FIG. 3 is a cross-sectional view of the display device taken along line X3-X4 of FIG. 1.
Figure 4:
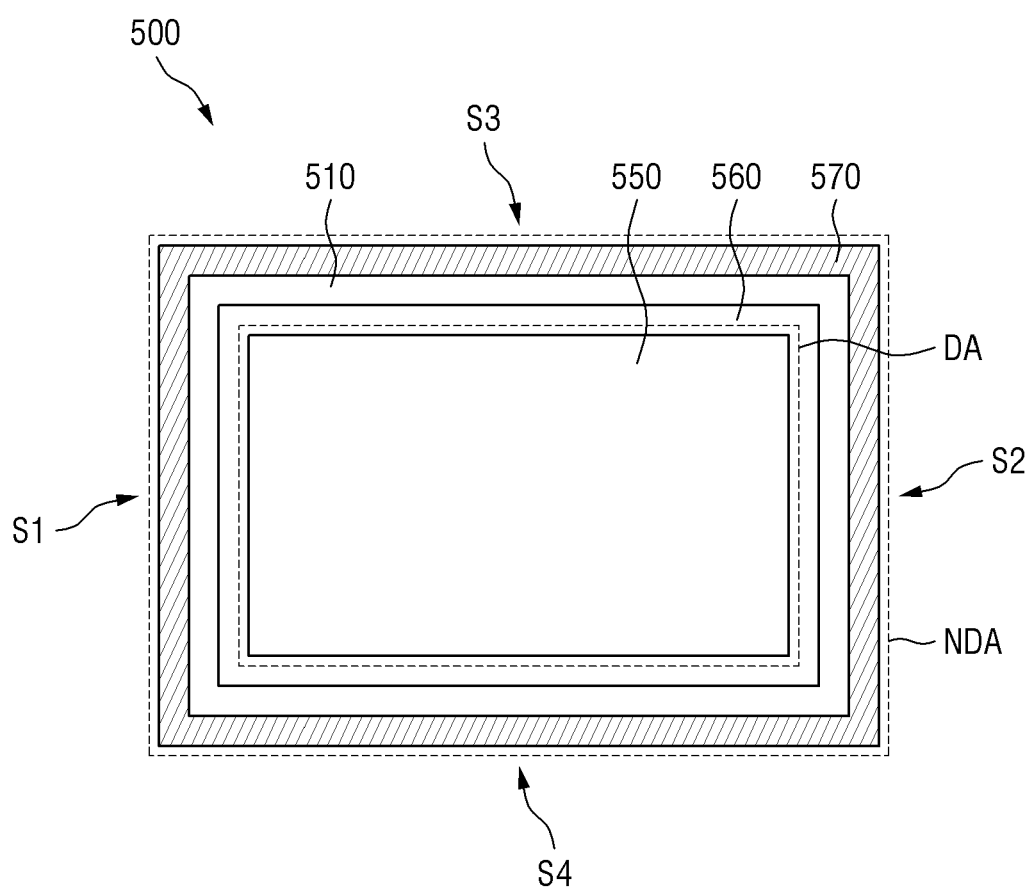
FIG. 4 is a plan view of an optical member shown in FIGS. 2 and 3.
Figure 5:
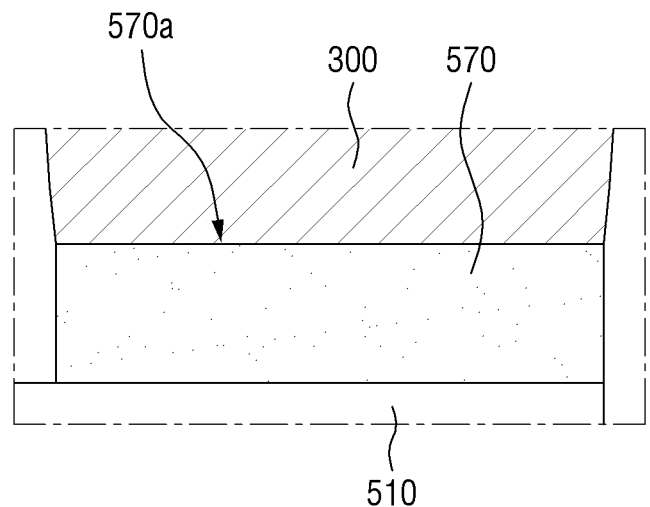
FIG. 5 is an enlarged view of portion Q of FIG. 2.

FIG. 2 is a cross-sectional view of the display device taken along line X1-X2 of FIG. 1. FIG. 3 is a cross-sectional view of the display device taken along line X3-X4 of FIG. 1. FIG. 4 is a plan view of an optical member shown in FIGS. 2 and 3. FIG. 5 is an enlarged view of portion Q of FIG. 2.

Referring to FIGS. 2 to 5, the display device 1 includes a display panel 100, an optical member 500 disposed below the display panel 100, and a light shielding resin 300 disposed between the display panel 100 and the optical member 500. The display device 1 may further include a reflecting member 700 and a receiving member 900 disposed below the optical member 500.

Unless specified otherwise, the terms "upper," "upper side," "upper portion," "top" and "upper surface" as used herein refer to a display surface side of the display panel 100, i.e., an upper side in the drawing and the terms "lower," "lower side," "lower portion," "bottom" and "lower surface" as used herein refer to an opposite side to the display surface side of the display panel 100, i.e., a lower side in the drawing.

The display panel 100 receives the light provided from the optical member 500 and generates an image corresponding to the input image data. Examples of the light receiving display panel which receives light to display an image on the screen may include a liquid crystal display panel and an electrophoretic panel. Hereinafter, a liquid crystal display panel is exemplified as the display panel 100, but various other light receiving display panels can be applied without being limited thereto.

The display panel 100 may include a display area DA and a non-display area NDA. The display area DA is an area for displaying an image, and the non-display area NDA is an area, disposed around the display area DA, where the image is not displayed. In some embodiments, the non-display area NDA may be disposed to surround the display area DA.

The display panel 100 may include a first substrate 110, a second substrate 130 and a liquid crystal layer disposed between the first substrate 110 and the second substrate 130. The display panel 100 may further include a light shielding layer 120 disposed between the first substrate 110 and the second substrate 130. In some embodiments, the light shielding layer 120 may be disposed to surround the display area DA to define the non-display area NDA.

A light shielding pattern 200 may be disposed on the side surface of the display panel 100. The light shielding pattern 200 can prevent light from being emitted from the side surface of the display panel 100. That is, the light shielding pattern 200 can block light leakage in the display panel 100. In some embodiments, the light shielding pattern 200 may fill a space between a sidewall 930 of the receiving member 900 and the display panel 100. The light shielding pattern 200 may include a light absorbing material. In some embodiments, the light shielding pattern 200 may be realized by a polymer resin, an adhesive tape, or the like.

In one embodiment, polarizing members may be disposed on the upper and lower surfaces of the display panel 100, respectively. However, this is merely exemplary, and in other embodiments, the polarizing member may be disposed in the display panel 100.

The optical member 500 is disposed below the display panel 100.

The optical member 500 includes a light guide plate 510 and a light transmission blocking pattern 570. The optical member 500 may further include a scattering pattern 530, a wavelength conversion layer 550 and a passivation layer 560.

The light guide plate 510 serves to guide light provided from a light source 410 of a light source member 400 toward the display panel 100. The light guide plate 510 may have a generally polygonal columnar shape. The planar shape of the light guide plate 510 may be rectangular, but is not limited thereto. In an exemplary embodiment, the light guide plate 510 may have a hexahedral shape having a rectangular planar shape, and may include upper and lower surfaces and four side surfaces S1, S2, S3 and S4. Hereinafter, the four side surfaces S1, S2, S3 and S4 are separately referred to as a first side surface S1, a second side surface S2, a third side surface S3 and a fourth side surface S4. The first side surface S1 may be a light incident surface on which the light emitted from the light source 410 is incident. The second side surface S2 which is a surface opposite to the first side surface S1 may be a light oppositely facing surface opposite to the light incident surface (i.e., the second side surface S2 is the surface facing oppositely away from the light source 410). The third side surface S3 may connect one end of the first side surface S1 to one end of the second side surface S2. The fourth side surface S4 may connect the other end of the first side surface S1 to the other end of the second side surface S2.

In one embodiment, the light guide plate 510 may entirely have a uniform thickness, but it is not limited thereto. For example, in the case of a wedge-shaped light guide plate, the light guide plate 510 may have a thickness which decreases from the first side surface S1 toward the second side surface S2 opposite to the first side surface S1. Further, the thickness of the light guide plate 510 may be reduced to a specific point, and the thickness of the light guide plate 510 may be constant after the specific point.

In some embodiments, the scattering pattern 530 may be disposed on the lower surface of the light guide plate 510. The scattering pattern 530 serves to change the traveling angle of light propagating in the light guide plate 510 by total reflection and to output the light to the outside of the light guide plate 510.

In one embodiment, the scattering pattern 530 may be provided in a separate layer or pattern. For example, a pattern layer including a protruding pattern and/or a concave groove pattern or a printed pattern may be formed on a lower surface of the light guide plate 510 to function as the scattering pattern 530.

In another embodiment, the scattering pattern 530 may have a surface shape of the light guide plate 510. For example, concave grooves may be formed on the lower surface of the light guide plate 510 to function as the scattering pattern 530.

The light guide plate 510 may include an inorganic material. For example, the light guide plate 510 may be made of glass, but is not limited thereto. In the case where the light guide plate 510 is made of a glass material, resistance to penetration for preventing or blocking external moisture and air from penetrating can be improved. In addition, when the light guide plate 510 is made of a glass material, it has an advantage of preventing deformation of the light guide plate 510 due to heat because the thermal expansion coefficient is relatively low and an advantage that the wavelength conversion layer 550 can be protected from heat because the thermal conductivity is relatively low.

The light source member 400 may be disposed adjacent to at least one side surface of the light guide plate 510. The light source member 400 may include the light source 410 and a printed circuit board 430. The light source 410 may be mounted on the printed circuit board 430 to receive a driving voltage from the printed circuit board 430. The light source 410 having received the driving voltage may provide light to the light guide plate 510. The light source 410 may include a plurality of point light sources or linear light sources. The point light source may be a light emitting diode (LED). For example, the light source 410 may be a blue LED that emits blue light.

In one embodiment, the light source 410 may be a top-emitting LED that emits light through the upper surface as shown in FIG. 2. In this case, the printed circuit board 430 may be disposed on the sidewall 930 of the receiving member 900.

Alternatively, in another embodiment, the light source 410 may be a side-emitting LED that emits light through the side surface. In this case, the printed circuit board 430 may be disposed on a bottom surface 910 of the receiving member 900.

Although it has been illustrated in the drawings that the light source member 400 is disposed so as to be adjacent to the first side surface S1 disposed at one long side of the light guide plate 510, the present disclosure is not limited thereto. For example, the light source member 400 may be disposed adjacent to the side surfaces (e.g., the first side surface S1 and the second side surface S2) of both long sides of the light guide plate 510. The light source member 400 may be disposed adjacent to the side surface (e.g., the third side surface S3) of one short side of the light guide plate 510. The light source member 400 may be disposed adjacent to the side surfaces, for example, the third side surface S3 and the fourth side surface S4, of both short sides of the light guide plate 510.

The wavelength conversion layer 550 may be disposed on the upper surface of the light guide plate 510. The wavelength conversion layer 550 converts the wavelength of at least a part of incident light. The wavelength conversion layer 550 may overlap the display area DA of the display panel 100. In some embodiments, a portion of the wavelength conversion layer 550 may overlap the non-display area NDA of the display panel 100.

The wavelength conversion layer 550 may include a binder layer and wavelength conversion particles dispersed in the binder layer. The wavelength conversion layer 550 may further include scattering particles dispersed in the binder layer in addition to the wavelength conversion particles.

The binder layer is a medium in which the wavelength conversion particles are dispersed, and may be formed of various resin compositions which may be generally referred to as a binder. However, the present disclosure is not limited thereto, and in this specification, a medium capable of dispersing and arranging the wavelength conversion particles and/or scattering particles may be referred to as a binder layer regardless of its name, additional other functions, constituent materials and the like.

The wavelength conversion particle is a particle for converting the wavelength of incident light, and may be, for example, a quantum dot (QD), a fluorescent material or a phosphorescent material. The quantum dot, which is an example of a wavelength conversion particle, is a material having a crystal structure of a few nanometers in size and/or hundreds to thousands of atoms, and exhibits a quantum confinement effect in which the energy band gap becomes larger due to its small size. When light having a wavelength with higher energy than the band gap is incident on the quantum dot, the quantum dot is excited by absorbing the light, and falls to a ground state while emitting light of a specific wavelength. The light of the emitted wavelength has a value corresponding to the band gap. The luminescence characteristics due to the quantum confinement effect can be adjusted by adjusting the size and composition of quantum dots.

The quantum dots may include, for example, at least one compound selected from the group consisting of Group II-VI compounds, Group II-V compounds, Group III-VI compounds, Group III-V compounds, Group IV-VI compounds, Group compounds, Group II-IV-VI compounds and Group II-IV-V compounds.

The quantum dot may include a core and a shell that overcoats the core. The core may be, but is not limited to, at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, $Fe_2O_3$, $Fe_3O_4$, Si and Ge. The shell may be, but is not limited to, at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe.

The wavelength conversion particles may include a plurality of wavelength conversion particles which convert incident light into light having a different wavelength. For example, the wavelength conversion particles may include first wavelength conversion particles which convert incident light of a specific wavelength into light of a first wavelength and emit the converted light, and second wavelength conversion particles which convert incident light of a specific wavelength into light of a second wavelength and emit the converted light. In an exemplary embodiment, the light emitted from the light source 410 and incident on the wavelength conversion particles may be light of a blue wavelength, the first wavelength may be a green wavelength, and the second wavelength may be a red wavelength. For example, the blue wavelength may be a wavelength having a peak at 420 to 470 nm, the green wavelength may be a wavelength having a peak at 520 nm to 570 nm, and the red wavelength may be a wavelength having a peak at 620 nm to 670 nm. However, it should be understood that the blue, green, and red wavelengths are not limited to the above examples and include all wavelength ranges that can be recognized as blue, green, and red in the art.

In the above exemplary embodiment, when the blue light incident on the wavelength conversion layer 550 passes through the wavelength conversion layer 550, a part of the incident blue light may be incident on the first wavelength conversion particles and converted into light of a green wavelength, another part of the incident blue light may be incident on the second wavelength conversion particles and converted into light of a red wavelength, and the remaining part may be emitted as it is without being incident on the first and second wavelength conversion particles. Accordingly, the light having passed through the wavelength conversion layer 550 includes all of blue wavelength light, green wavelength light and red wavelength light. If the ratio of the emitted lights of different wavelengths is appropriately adjusted, the emitted light of white light or other colors may be displayed. The lights converted in the wavelength conversion layer 550 are concentrated within a narrow range of specific wavelengths, and have a sharp spectrum with a narrow half width. Therefore, when light having the spectrum is filtered by a color filter to implement colors, the color reproducibility can be improved.

Unlike the above exemplary embodiment, the incident light may be short wavelength light (such as ultraviolet light) and three types of wavelength conversion particles for converting the incident light into lights of blue, green and red wavelengths, respectively, may be arranged in the wavelength conversion layer 550 to emit white light.

The wavelength conversion layer 550 may further include scattering particles. The scattering particles may be non-quantum particles, which have no wavelength conversion function. The scattering particles scatter the incident light so that more incident light can be incident on the wavelength conversion particles. In addition, scattering particles may serve to uniformly control the emission angle of light of each wavelength. Specifically, it has scattering characteristics such that when a part of the incident light is incident on the wavelength conversion particles and emitted after converting the wavelength, the emission direction is random. If there are no scattering particles in the wavelength conversion layer 550, green and red wavelength light emitted after collision with the wavelength conversion particles have scattering emission characteristics, but blue wavelength light emitted without collision with the wavelength conversion particles does not have scattering emission characteristics. Accordingly, the emission amount of blue/green/red wavelength light will be different depending on the emission angle. The scattering particles impart scattering emission characteristics to the blue wavelength light emitted without colliding with the wavelength converting particles, so that the emission angle of light of each wavelength can be similarly controlled. As scattering particles, $TiO_2$, $SiO_2$ and the like may be used.

The wavelength conversion layer 550 may be formed by a method such as coating. For example, the wavelength conversion composition may be slit-coated on the light guide plate 50, dried and cured to form the wavelength conversion layer 550. However, it is not limited thereto, and various other lamination methods may be applied.

A passivation layer 560 may be disposed on the wavelength conversion layer 550. The passivation layer 560 serves to prevent penetration of moisture and/or oxygen (hereinafter referred to as 'moisture/oxygen'). In some embodiments, the passivation layer 560 may include an inorganic material. For example, it may be formed to include: a material selected from the group consisting of silicon nitride, aluminum nitride, zirconium nitride, titanium nitride, hafnium nitride, tantalum nitride, silicon oxide, aluminum oxide, titanium oxide, tin oxide, cerium oxide and silicon oxynitride; and/or a metal thin film having a desired light transmittance; and/or the like. In an exemplary embodiment, the passivation layer 560 may be formed of silicon nitride.

The passivation layer 560 may completely cover the wavelength conversion layer 550 on at least one side surface. In an exemplary embodiment, the passivation layer 560 may completely cover the wavelength conversion layer 550 on all side surfaces, but the present disclosure is not limited thereto.

The passivation layer 560 may completely cover the wavelength conversion layer 550, cover the upper surface of the wavelength conversion layer 550 and extend further outward from the upper surface to cover the side surface of the wavelength conversion layer 550. In some embodiments, the passivation layer 560 may extend to the upper surface of the light guide plate 510 not covered by the wavelength conversion layer 550, so that a part of the edge of the passivation layer 560 can be in direct contact with the upper surface of the light guide plate 510.

The wavelength conversion layer 550 (particularly, the wavelength conversion particles contained therein) is vulnerable to moisture/oxygen. In the case of a wavelength conversion film, a barrier film is laminated on the upper and lower surfaces of the wavelength conversion layer to prevent moisture/oxygen penetration into the wavelength conversion layer 550. However, in this embodiment, since the wavelength conversion layer 550 is directly disposed on the light guide plate 510 without the barrier film, it is necessary to provide a sealing structure for protecting the wavelength conversion layer 550 in place of the barrier film. The sealing structure may be implemented by the passivation layer 560 and the light guide plate 510. Each of the passivation layer 560 and the light guide plate 510 includes an inorganic material, so that an inorganic-inorganic bond is formed at the contact portion between the passivation layer 560 and the light guide plate 510. Thus, penetration of water/oxygen from the outside can be effectively prevented or blocked.

The passivation layer 560 may be formed by a method such as vapor deposition. For example, the passivation layer 560 may be formed on the light guide plate 510, on which the wavelength conversion layer 550 is formed, by chemical vapor deposition. However, it is not limited thereto, and various other lamination methods may be applied.

As described above, the light guide plate 510 and the wavelength conversion layer 550 may be integrated into a single member that performs both a light guide function and a wavelength conversion function. The integrated single member can simplify an assembling process of the display device 1. Further, by sealing the wavelength conversion layer 550 with the passivation layer 560 or the like, deterioration of the wavelength conversion layer 550 can be prevented or blocked.

Further, in the case of using a wavelength conversion film provided as a separate film, the manufacturing cost can be relatively lowered and the thickness can be reduced. For example, the wavelength conversion film adheres the upper and lower barrier films of the wavelength conversion layer 550. The barrier film is not only expensive but also thick (having a thickness of 100 μm or more), and thus, the total thickness of the wavelength conversion film becomes about 270 μm. On the other hand, in the case of the present embodiment, since a separate barrier film can be omitted, the thickness of the display device 1 can be reduced. In addition, since an expensive barrier film can be omitted, it is possible to reduce the manufacturing cost as compared to the case of using the wavelength conversion film.

The light transmission blocking pattern 570 is disposed on the edge of the upper surface of the light guide plate 510. The light transmission blocking pattern 570 prevents or blocks transmission of visible light and transmits ultraviolet light from the incident light.

The amount of light emitted from the upper surface of the light guide plate 510 may differ from region to region. For example, near the first side surface S1 which is a light incident surface, the light incident on the upper surface of the light guide plate 510 at an angle smaller than the critical angle of total reflection is relatively large. Therefore, near the first side surface S1, the amount of light emitted may be larger compared to other regions. Also near the second side surface S2, which is a light facing surface, the third side surface S3 or the fourth side surface S4, the light may be emitted upward without following a light guide path.

As described above, the edge portion of the light guide plate 510 may have a larger light emission amount than the central portion, which may be viewed as light leakage from the display screen.

The light transmission blocking pattern 570 is disposed at the edge portion of the upper surface of the light guide plate 510 having a relatively large light emission amount, and serves to block the light leakage by blocking transmission of visible light of the incident light.

In some embodiments, the light transmission blocking pattern 570 may be arranged in a rectangular frame on the edge portions of the four sides of the light guide plate 50. The light transmission blocking pattern 570 may be disposed so as not to overlap display area DA and so as to overlap the non-display area NDA. Also, the light transmission blocking pattern 570 may be arranged to surround the display area DA in a plan view and may be formed in a closed loop shape. With respect to the wavelength conversion layer 550 and the passivation layer 560, the light transmission blocking pattern 570 may be arranged to surround the wavelength conversion layer 550 in a plan view. In some embodiments, the light transmission blocking pattern 570 may be arranged to surround the passivation layer 560 without contacting the passivation layer 560.

However, the present disclosure is not limited thereto. In another embodiment, the light transmission blocking pattern 570 may be disposed only at the edge portion near the first side surface S1 having a relatively large amount of light entering, or may be disposed only at the edge portions near the first side surface S1 and the second side surface S2.

The light transmission blocking pattern 570 may transmit an ultraviolet light portion of the incident light. Accordingly, the ultraviolet light irradiated from the lower side of the optical member 500 during curing of the light shielding resin 300 may be provided to the light shielding resin 300 through the light transmission blocking pattern 570. Thus, the curing of the light shielding resin 300 can be performed more smoothly.

In one embodiment, the light transmission blocking pattern 570 may be formed of a mixture of a light absorbing material and an ultraviolet ray transmitting material. For example, the light absorbing material may be carbon black or titanium black having a composition expressed by general formula TiNxOy ($0<x<1.5$ and $0.16<y<2$), or ($1.0<x+y<2.0$ and $2x<y$). The ultraviolet ray transmitting material may include at least one of acrylic resin, cyclohexanone, aromatic hydrocarbon solvent and ethylene glycol monoethyl ether acetate.

Alternatively, in another embodiment, the light transmission blocking pattern 570 may have a multilayer film structure in which a high refractive index film having a first refractive index (e.g., a refractive index of 1 or more) and a low refractive index film having a second refractive index (e.g., a refractive index less than 1) lower than the first refractive index are alternately stacked.

In addition, the light transmission blocking pattern 570 may have a variety of materials and various structures as long as it can prevent or block transmission of visible light and transmit ultraviolet light.

Figure 6:
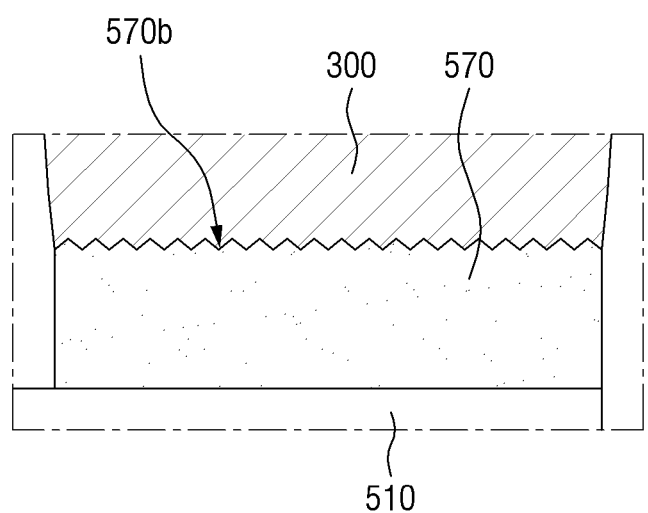
FIGS. 6 and 7 are views showing modified embodiments of FIG. 5.
Figure 7:
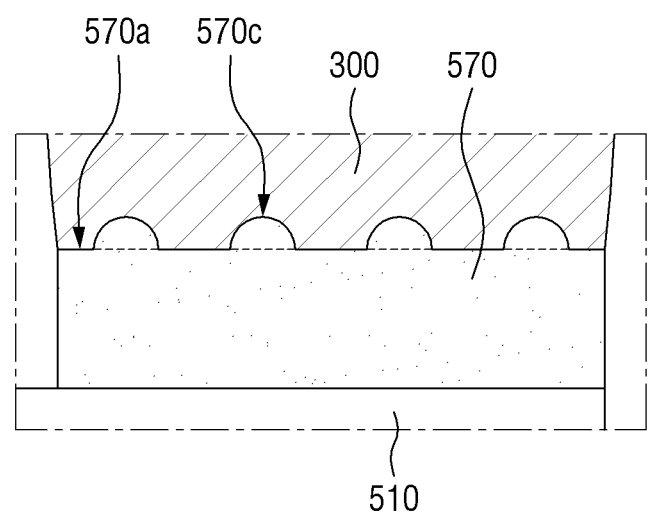

In some embodiments, an upper surface 570a of the light transmission blocking pattern 570 may be substantially flat as shown in FIG. 5. Alternatively, as shown in FIG. 6, an upper surface 570b of the light transmission blocking pattern 570 may be a surface which is not substantially flat and has an irregular concavo-convex pattern formed thereon, as shown in FIG. 6. In this case, the ultraviolet light irradiated from the lower side in the curing process of the light shielding resin 300 can be uniformly incident on the light shielding resin 300 by scattering/diffusion by the concavo-convex pattern. Alternatively, as shown in FIG. 7, the upper surface 570a of the light transmission blocking pattern 570 is substantially parallel, and an optical pattern 570c may be disposed on the upper surface 570a. In one embodiment, the optical pattern 570c may be integrated with the light transmission blocking pattern 570.

The optical pattern 570c may change the optical path so that the ultraviolet light irradiated from the lower side goes straight upward in the curing process of the light shielding resin 300. Accordingly, the curing of the light shielding resin 300 can be performed more smoothly. In some embodiments, the cross-sectional shape of the optical pattern 570c may be semicircular or semi-elliptical as shown in FIG. 7, but it is not limited thereto and may have various shapes such as a triangle, a rectangle and other polygons.

The light shielding resin 300 may be disposed between the optical member 500 and the display panel 100. The light shielding resin 300 can couple the optical member 500 and the display panel 100 and can prevent or block light leakage from occurring in the space between the optical member 500 and the display panel 100.

The light shielding resin 300 may be disposed so as not to overlap the display area DA of the display panel 100 and so as to overlap the non-display area NDA of the display panel 100, and may be disposed so as to overlap the light transmission blocking pattern 570. Further, the light shielding resin 330 may be arranged in a rectangular frame so as to overlap the non-display area NDA. In some embodiments, the light shielding resin 300 may be in contact with the light transmission blocking pattern 570 and the display panel 100.

The light shielding resin 300 may be made of a photocurable resin which is cured by ultraviolet light, and may include a light shielding material. The light blocking material may be a colored material such as carbon black and/or titanium black. However, it is not limited thereto, and various suitable materials capable of absorbing light may be used as the light blocking material. Alternatively, the light absorbing material may be a photosensitive material which changes its color to black in a transparent state. For example, a photosensitive material such as silver bromide, silver iodide and/or silver chloride may be used as the light shielding material. In this case, when the light shielding resin 300 is cured by ultraviolet light, the light shielding resin 300 reacts with ultraviolet light to change its color to black, thereby blocking the light.

The display device 1 may further include the reflecting member 700 disposed below the light guide plate 510. The reflecting member 700 may include a reflective film or a reflective coating layer. The reflecting member 700 reflects the light emitted from the bottom surface of the light guide plate 510 back to the inside of the light guide plate 510.

The display device 1 may further include the receiving member 900. The receiving member 900 with one surface being open includes a bottom surface 910 and a sidewall 930 connected to the bottom surface 910. The light source member 400, the optical member 500, the light shielding resin 300, the reflecting member 700 and the like may be accommodated in the space defined by the bottom surface 910 and the sidewall 930.

Figure 8:
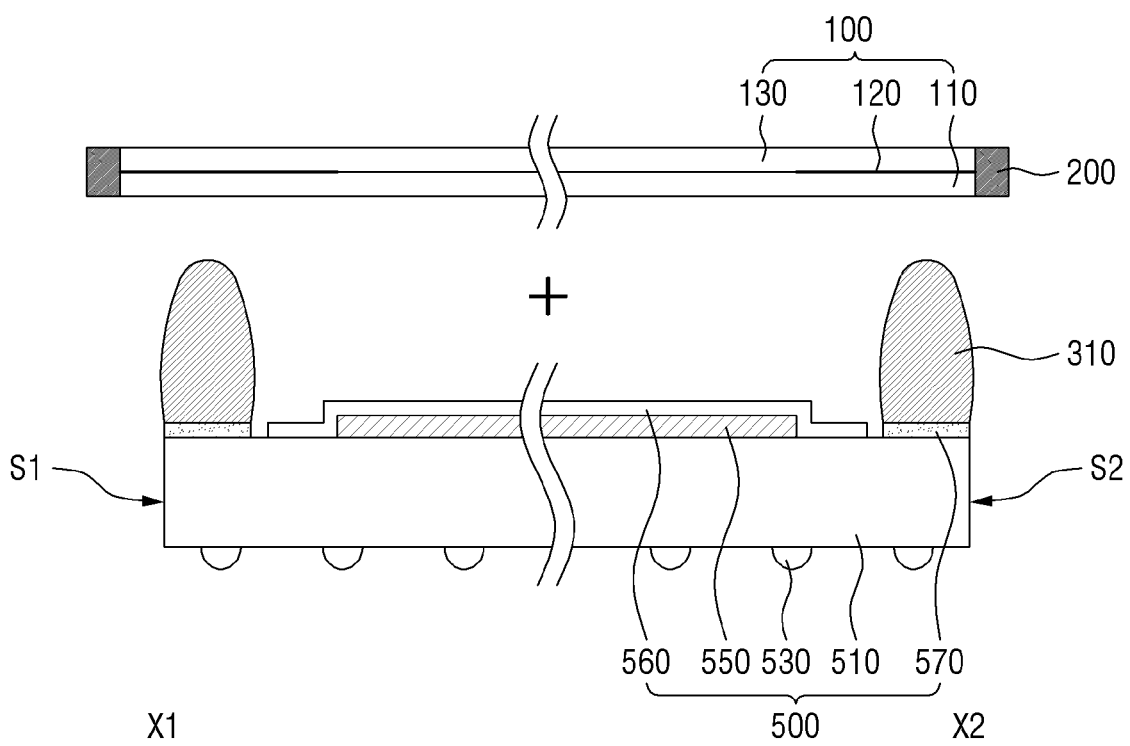
FIGS. 8 and 9 are views showing a coupling process of a display panel and an optical member.
Figure 9:
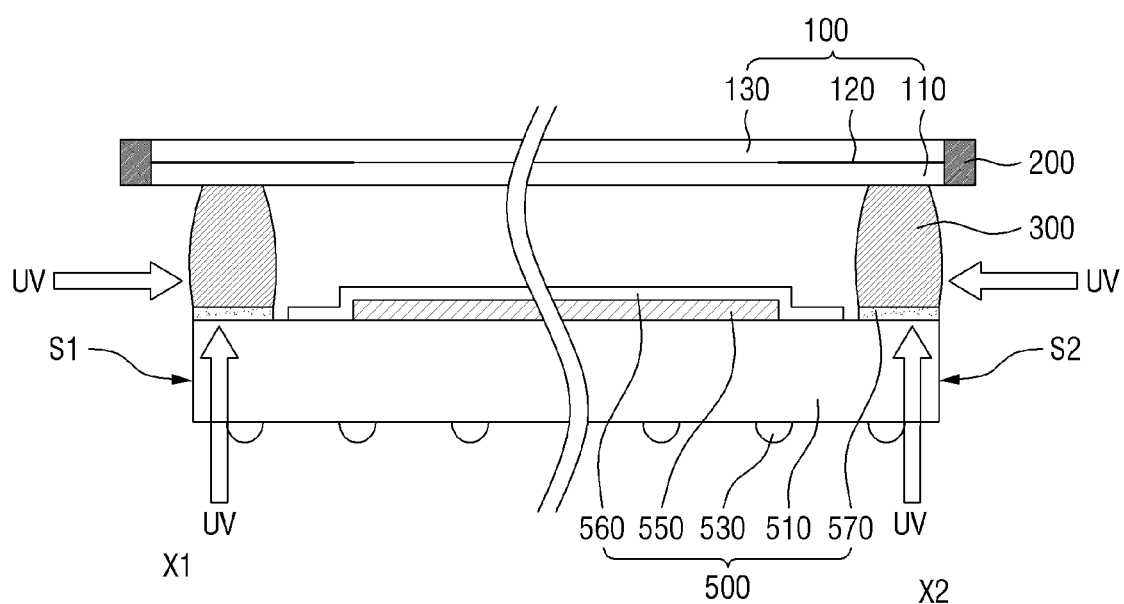

FIGS. 8 and 9 are views showing a coupling process of a display panel and an optical member.

Referring to FIGS. 8 and 9, first, the optical member 500 is prepared. The optical member 500 may include the light guide plate 510 and the light transmission blocking pattern 570, and the optical member 500 may further include the scattering pattern 530, the wavelength conversion layer 550 and the passivation layer 560 as described above. Then, a resin 310 is coated on the upper edge of the optical member 500. The resin 310 may be coated on the optical member 500 using a nozzle or the like. The resin 310 may be made of a photo-curable resin and may include a light shielding material as described above in connection with the light shielding resin 300.

Thereafter, the optical member 500 to which the resin 310 is coated is bonded to the display panel 100.

Thereafter, the light shielding resin 300 is formed by irradiating ultraviolet light (UV) from the lateral side and the lower side, respectively, to cure the resin 310. The ultraviolet light (UV) irradiated from the lateral side is directly provided to the resin 310 and the ultraviolet light irradiated from the lower side is provided to the resin 310 through the light guide plate 510 and the light transmission blocking pattern 570. Accordingly, curing can be performed smoothly even on a lower portion of the light shielding resin 300 adjacent to the light transmission blocking pattern 570, and a problem such as poor bonding between the display panel 100 and the optical member 500 can be prevented. Ultimately, the reliability of the display device 1 can be improved or reduced.

Figure 10:
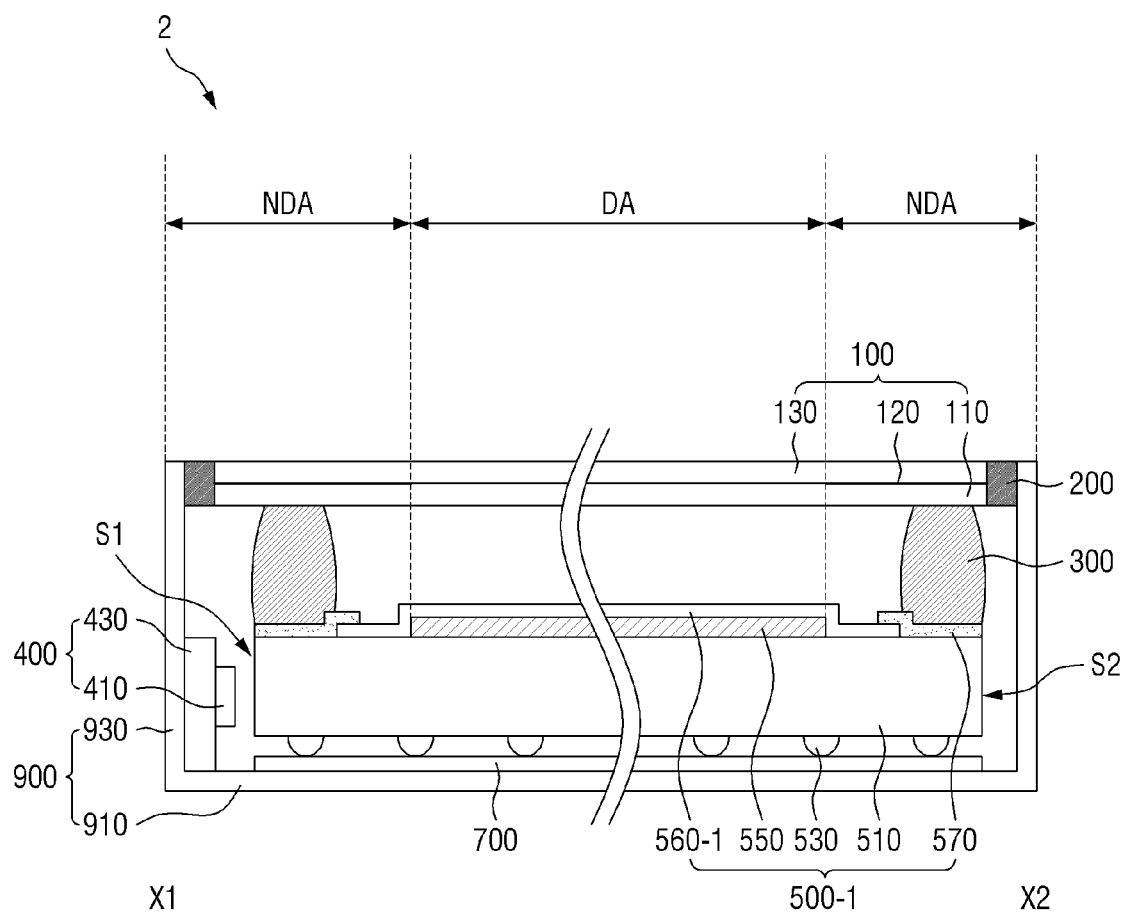
FIG. 10 is a cross-sectional view of a display device according to another embodiment taken along line X1-X2 of FIG. 1.
Figure 11:
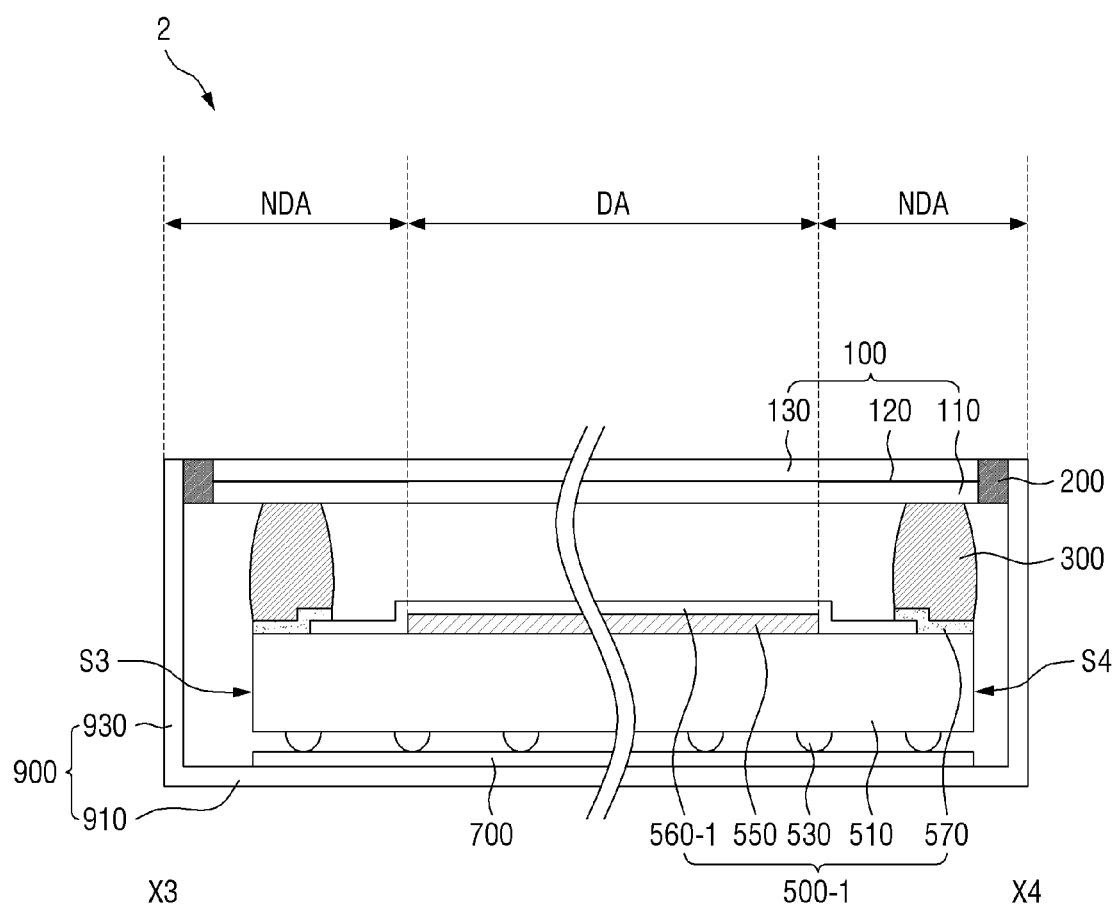
FIG. 11 is a cross-sectional view of a display device according to another embodiment taken along line X3-X4 of FIG. 1.

FIG. 10 is a cross-sectional view of a display device according to another embodiment taken along line X1-X2 of FIG. 1. FIG. 11 is a cross-sectional view of a display device according to another embodiment taken along line X3-X4 of FIG. 1.

Referring to FIGS. 10 and 11, a display device 2 according to the present embodiment is different from the display device 1 described above with reference to FIGS. 2 to 7 in that a passivation layer 560-1 is partially extended to contact the light transmission blocking pattern 570 and a portion of the light transmission blocking pattern 570 is disposed on the passivation layer 560-1, and the other configurations are substantially the same or similar. Thus, a redundant description will be omitted and differences are mainly described.

The passivation layer 560-1 may extend toward the light transmission blocking pattern 570 to contact the light transmission blocking pattern 570. Further, a portion of the passivation layer 560-1 may be disposed below the light transmission blocking pattern 570. That is, at least a portion of the light transmission blocking pattern 570 may be disposed on the passivation layer 560-1.

The light shielding resin 300 may be disposed on the light transmission blocking pattern 570 and may be in contact with the light transmission blocking pattern 570 as described above. In some embodiments, the exposed portion of the light guide plate 510 may be absent between the light transmission blocking pattern 570 and the passivation layer 560. Accordingly, the light shielding resin 300 may not be in direct contact with the light guide plate 510.

Figure 12:
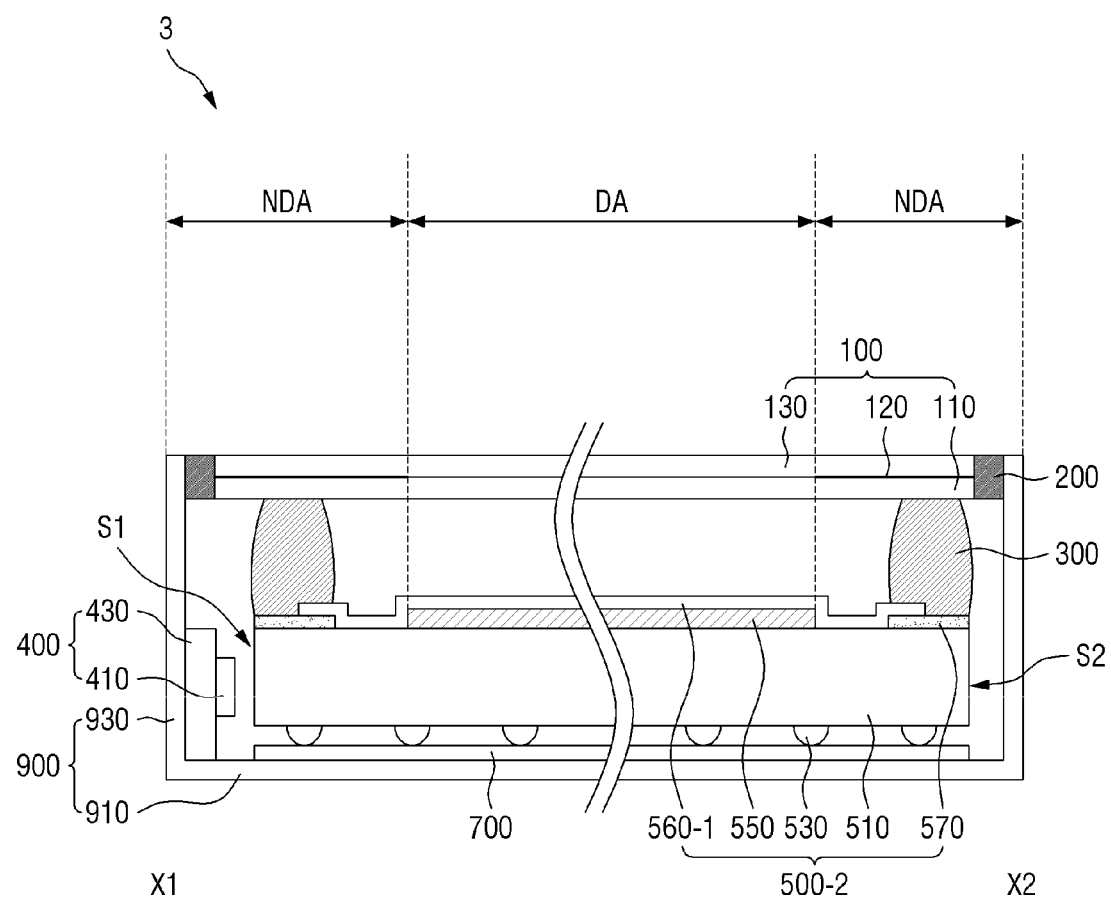
FIG. 12 is a cross-sectional view of a display device according to still another embodiment taken along line X1-X2 of FIG. 1.
Figure 13:
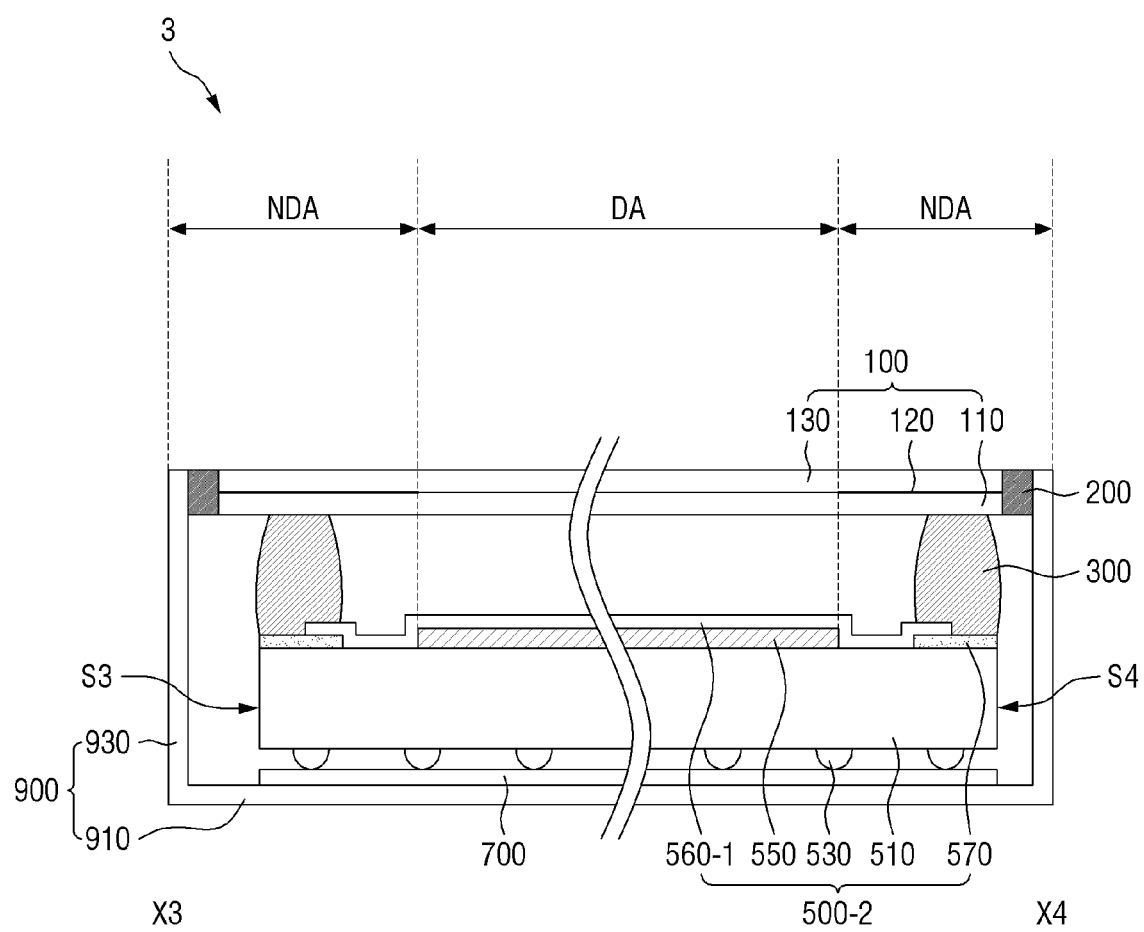
FIG. 13 is a cross-sectional view of a display device according to still another embodiment taken along line X3-X4 of FIG. 1.

FIG. 12 is a cross-sectional view of a display device according to still another embodiment taken along line X1-X2 of FIG. 1. FIG. 13 is a cross-sectional view of a display device according to still another embodiment taken along line X3-X4 of FIG. 1.

Referring to FIGS. 12 and 13, a display device 3 according to the present embodiment is different from the display device 2 described above with reference to FIGS. 11 and 12 in that the passivation layer 560-1 is partially extended to contact the light transmission blocking pattern 570 and a portion of the passivation layer 560-1 is disposed on the light transmission blocking pattern 570, and the other configurations are substantially the same or similar.

The passivation layer 560-1 may extend toward the light transmission blocking pattern 570 to contact the light transmission blocking pattern 570. Further, a portion of the passivation layer 560-1 may be disposed on the light transmission blocking pattern 570. That is, at least a portion of the light transmission blocking pattern 570 may be disposed below the passivation layer 560-1.

The light shielding resin 300 may be disposed on the light transmission blocking pattern 570 and may be in contact with the light transmission blocking pattern 570 as described above. In addition, since a portion of the passivation layer 560-1 is disposed on the light transmission blocking pattern 570, the light shielding resin 300 may be in partial contact with the passivation layer 560-1.

In some embodiments, the exposed portion of the light guide plate 510 may be absent between the light transmission blocking pattern 570 and the passivation layer 560. Accordingly, the light shielding resin 300 may not be in direct contact with the light guide plate 510 as described above.

Figure 14:
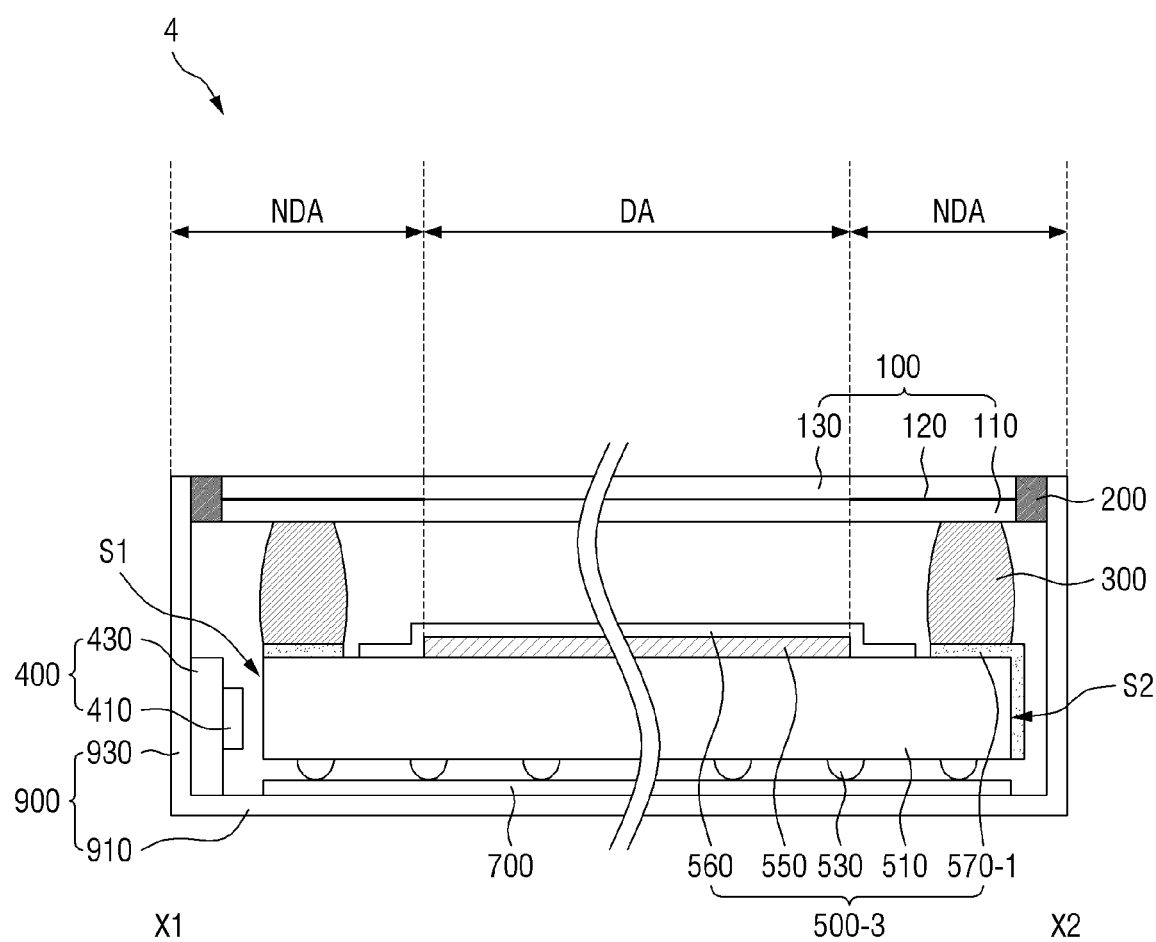
FIG. 14 is a cross-sectional view of a display device according to still another embodiment taken along line X1-X2 of FIG. 1.
Figure 15:
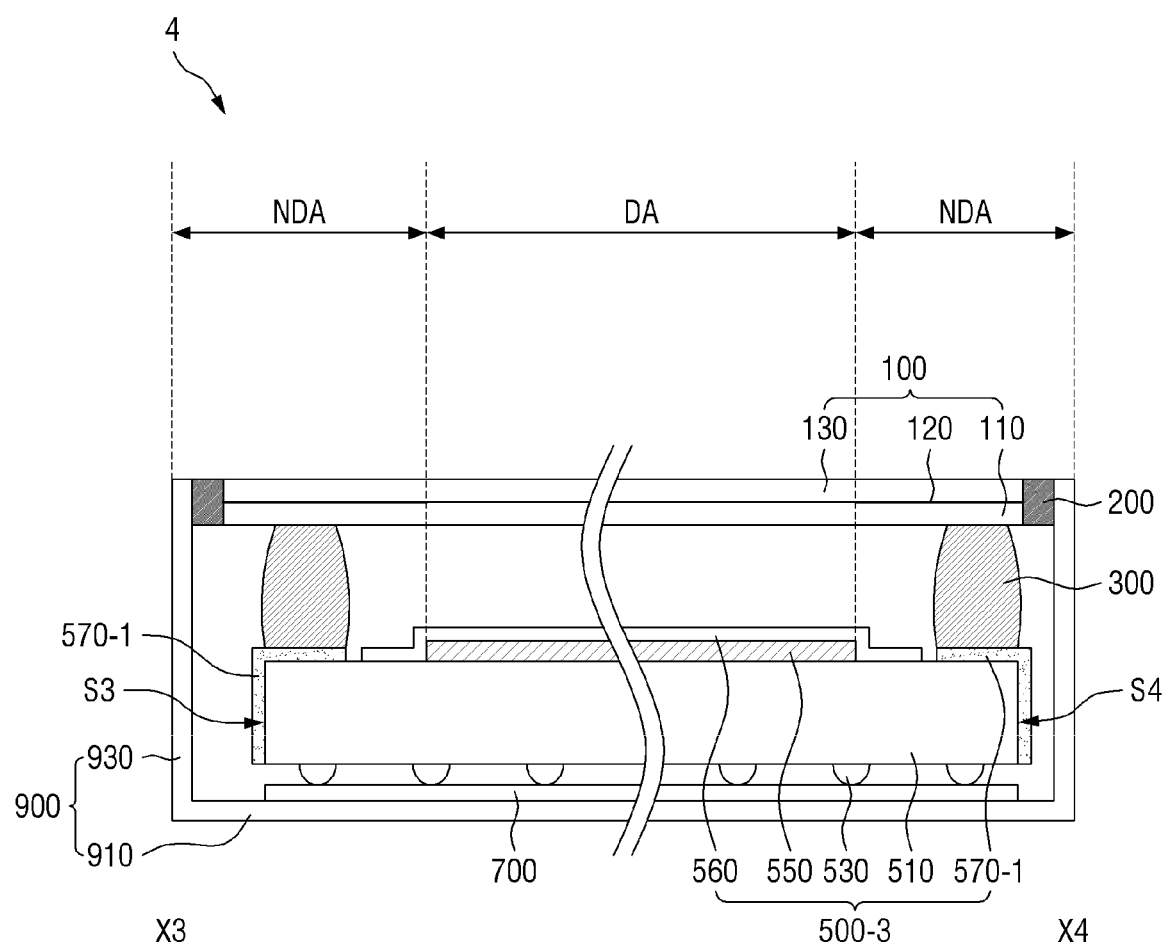
FIG. 15 is a cross-sectional view of a display device according to still another embodiment taken along line X3-X4 of FIG. 1.

FIG. 14 is a cross-sectional view of a display device according to still another embodiment taken along line X1-X2 of FIG. 1. FIG. 15 is a cross-sectional view of a display device according to still another embodiment taken along line X3-X4 of FIG. 1.

Referring to FIGS. 14 and 15, a display device 4 according to the present embodiment is different from the display device 1 described above with reference to FIGS. 2 to 7 only in a configuration of a light transmission blocking pattern 570-1, and the other configurations are substantially the same or similar. Thus, differences are mainly described below.

The light transmission blocking pattern 570-1 of the display device 4 may further include a portion in contact with the second side surface S2 which is the light facing surface of the light guide plate 510 and covering the second side surface S2 in addition to a portion disposed along the edge of the upper surface of the light guide plate 510. Accordingly, the light leakage generated from the second side surface S2, which is the light facing surface of the light guide plate 510, can be blocked. In the case of the second side surface S2 which is the light facing surface facing the first side surface S1 which is the light incident surface, light leakage is likely to occur. Therefore, since the light transmission blocking pattern 570-1 further includes a portion covering the second side surface S2, the light leakage can be blocked more effectively.

The light transmission blocking pattern 570-1 may further include portions in contact with the third side surface S3 and the fourth side surface S4 of the light guide plate 510 and covering the third side surface S3 and the fourth side surface S4, respectively. Accordingly, the light leakage generated from the third side surface S3 and the fourth side surface S4 of the light guide plate 510 can be blocked.

Figure 16:
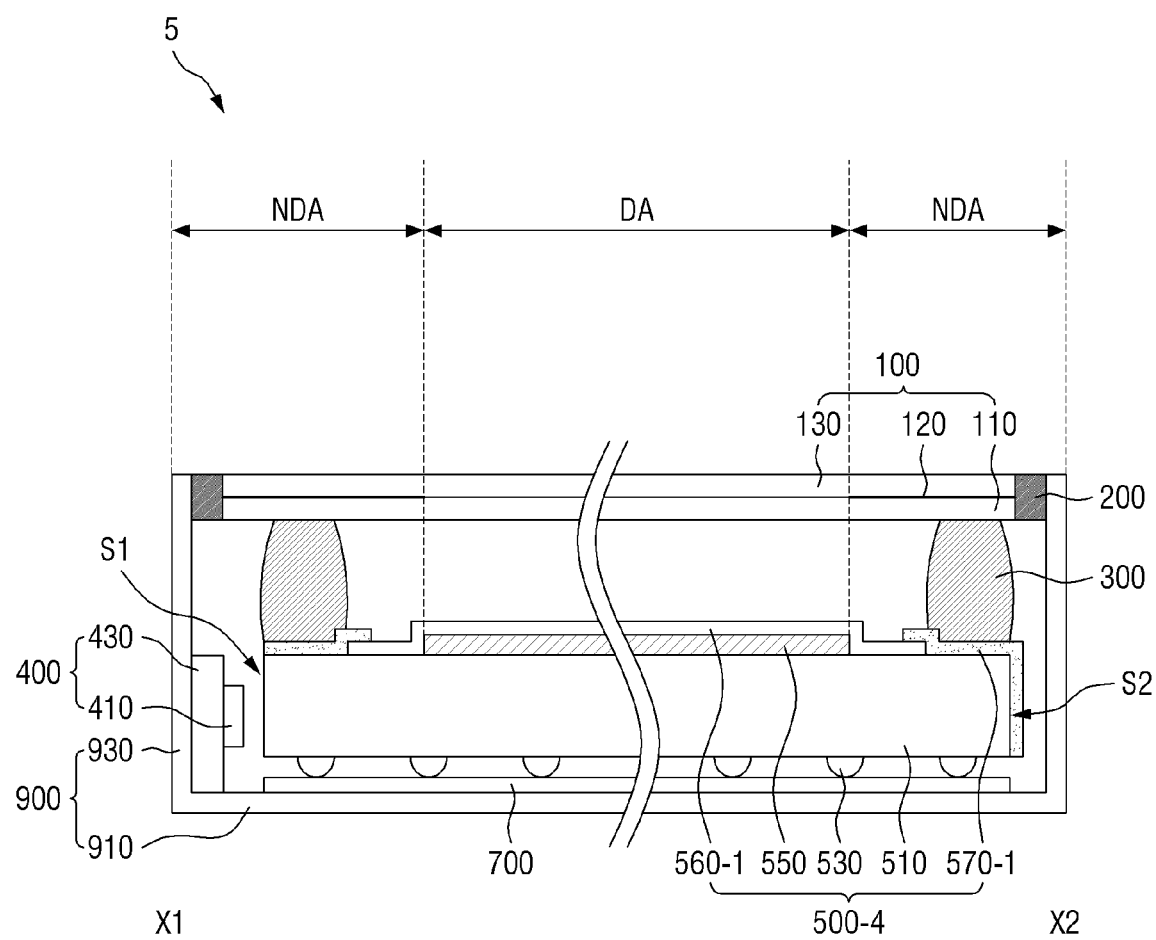
FIG. 16 is a cross-sectional view of a display device according to still another embodiment taken along line X1-X2 of FIG. 1.
Figure 17:
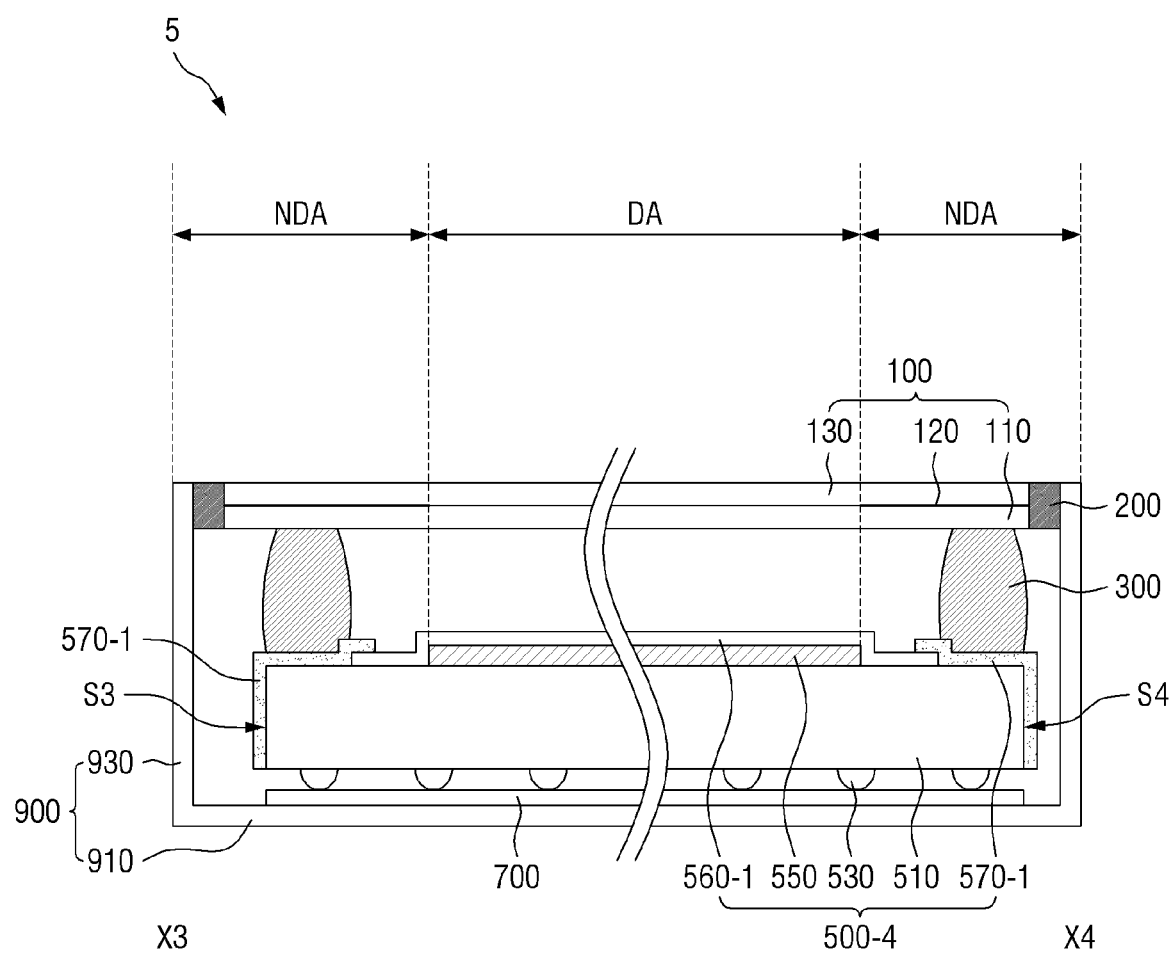
FIG. 17 is a cross-sectional view of a display device according to still another embodiment taken along line X3-X4 of FIG. 1.

FIG. 16 is a cross-sectional view of a display device according to still another embodiment taken along line X1-X2 of FIG. 1. FIG. 17 is a cross-sectional view of a display device according to still another embodiment taken along line X3-X4 of FIG. 1.

Referring to FIGS. 16 and 17, a display device 5 according to the present embodiment is different from the display device 2 described above with reference to FIGS. 10 and 11 only in a configuration of the light transmission blocking pattern 570-1, and the other configurations are substantially the same or similar. The light transmission blocking pattern 570-1 may include a portion covering the second side surface S2 of the light guide plate 510 and may further include portions covering the third side surface S3 and the fourth side surface S4 of the light guide plate 510, respectively, as described above with reference to FIGS. 14 and 15.

Figure 18:
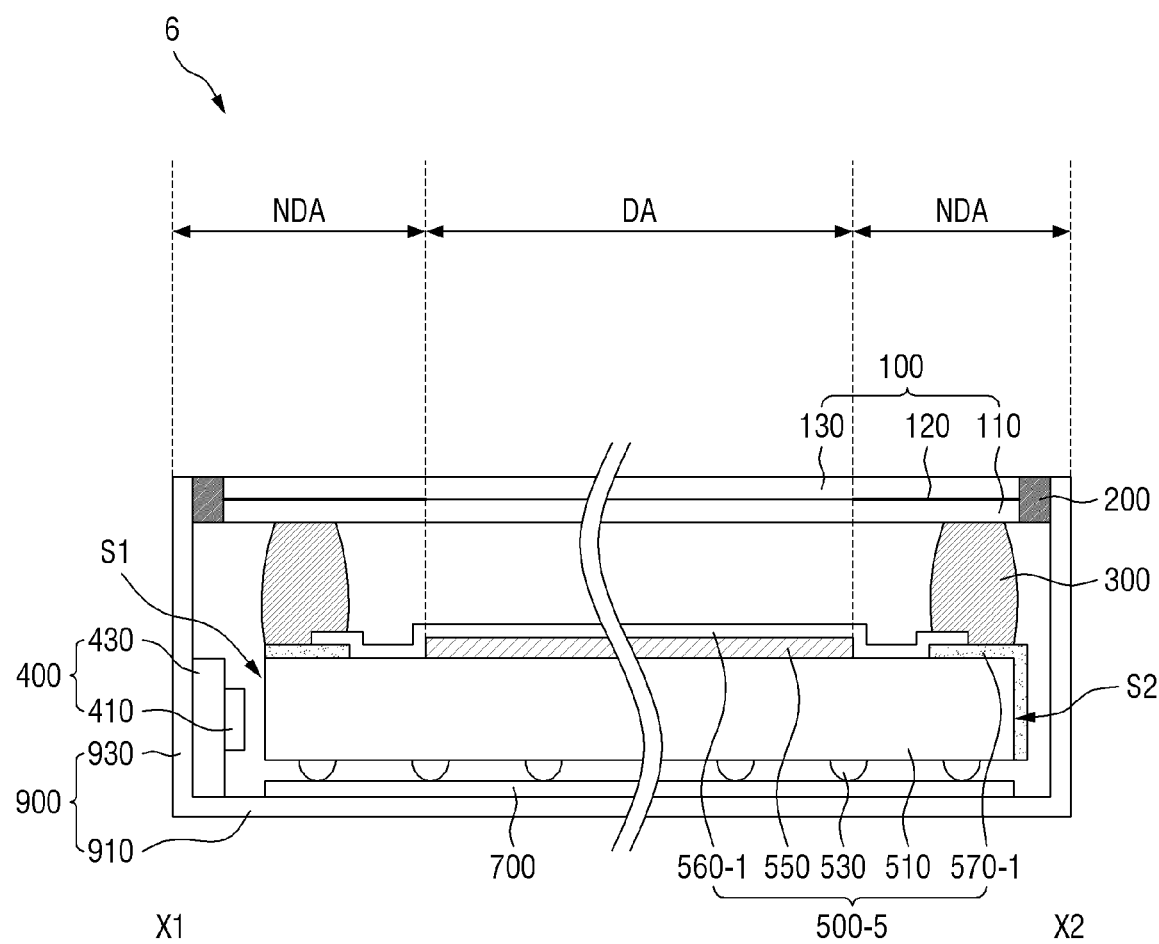
FIG. 18 is a cross-sectional view of a display device according to still another embodiment taken along line X1-X2 of FIG. 1.
Figure 19:
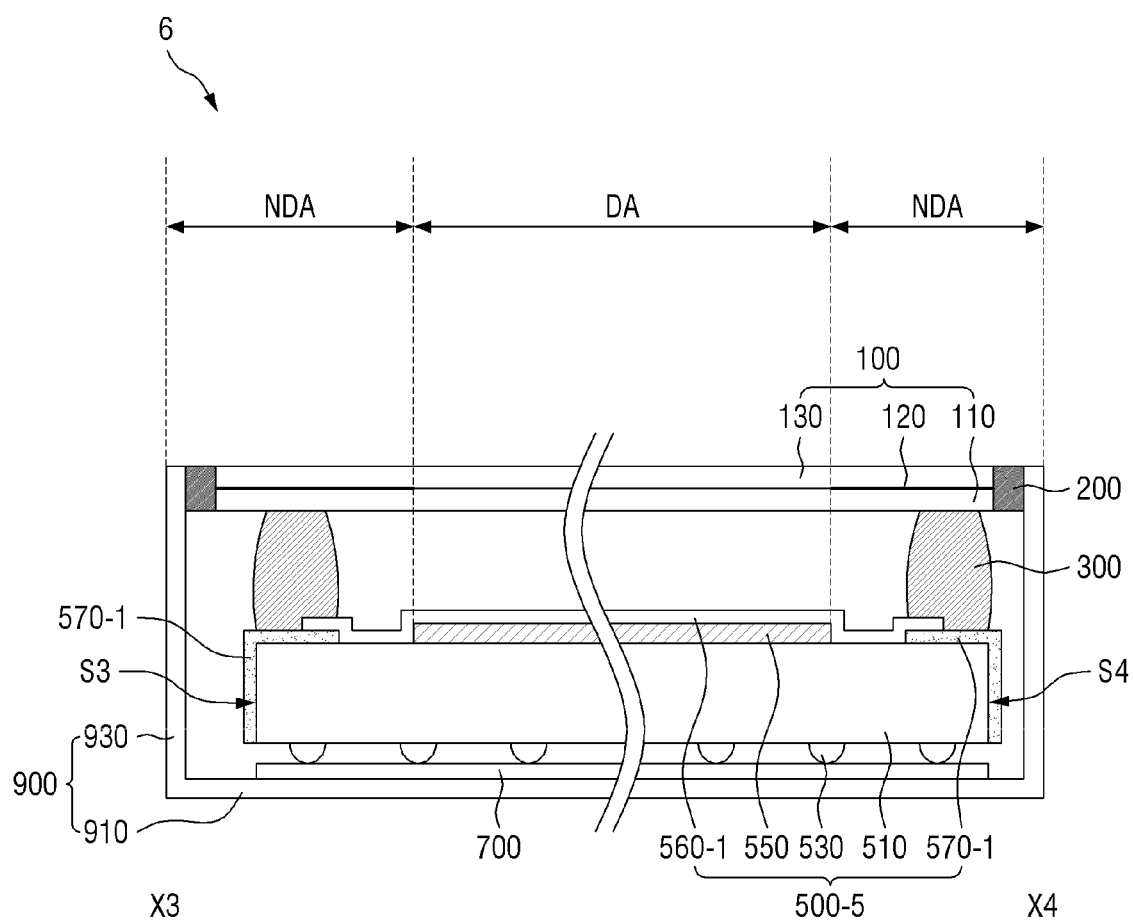
FIG. 19 is a cross-sectional view of a display device according to still another embodiment taken along line X3-X4 of FIG. 1.

FIG. 18 is a cross-sectional view of a display device according to still another embodiment taken along line X1-X2 of FIG. 1. FIG. 19 is a cross-sectional view of a display device according to still another embodiment taken along line X3-X4 of FIG. 1. Referring to FIGS. 18 and 19, a display device 6 according to the present embodiment is different from the display device 3 described above with reference to FIGS. 12 and 13 only in a configuration of the light transmission blocking pattern 570-1, and the other configurations are substantially the same or similar. Since the other description of the light transmission blocking pattern 570-1 is the same as that described above with reference to FIGS. 14 and 15, it will be omitted.

Figure 20:
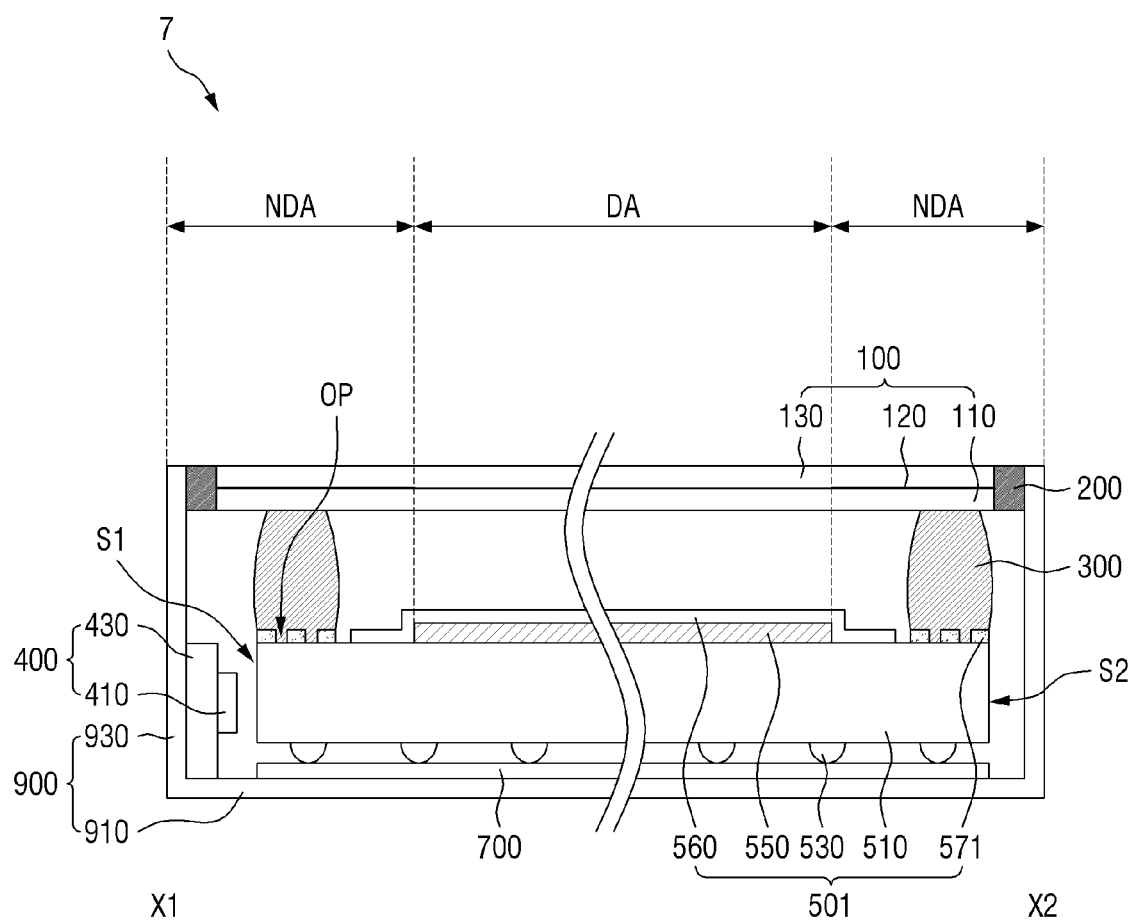
FIG. 20 is a cross-sectional view of a display device according to still another embodiment taken along line X1-X2 of FIG. 1.
Figure 21:
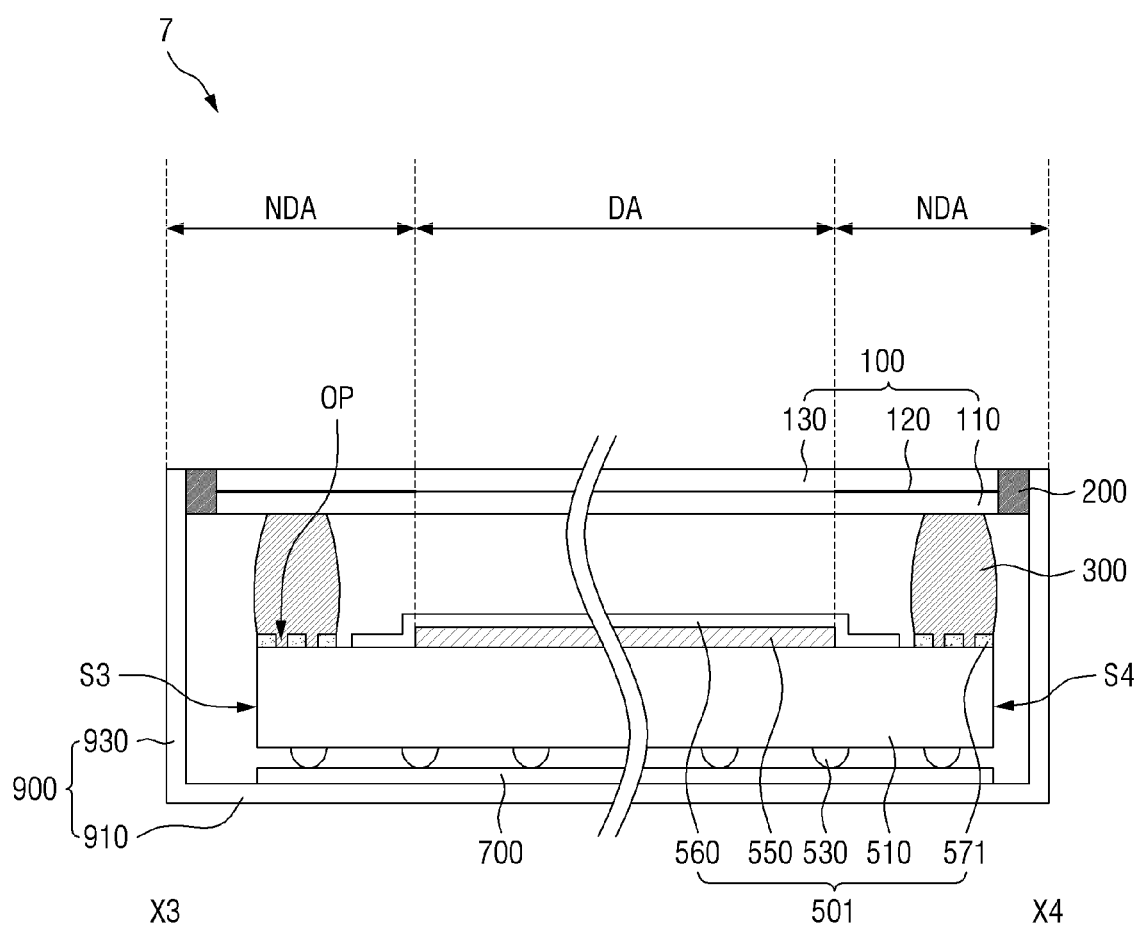
FIG. 21 is a cross-sectional view of a display device according to still another embodiment taken along line X3-X4 of FIG. 1.

FIG. 20 is a cross-sectional view of a display device according to still another embodiment taken along line X1-X2 of FIG. 1. FIG. 21 is a cross-sectional view of a display device according to still another embodiment taken along line X3-X4 of FIG. 1.

Referring to FIGS. 20 and 21, a display device 6 according to the present embodiment is different from the display device 1 described above with reference to FIGS. 2 to 7 only in a configuration of a light transmission blocking pattern 571, and the other configurations are substantially the same or similar.

The optical member 500 may include the light guide plate 510 and the light transmission blocking pattern 571 and may further include the scattering pattern 530, the wavelength conversion layer 550 and the passivation layer 560.

The light transmission blocking pattern 571 absorbs or reflects incident light to partially or completely block the transmission of light in the corresponding area. In some embodiments, the light transmission blocking pattern 571 may block ultraviolet light as well as visible light.

In one embodiment, the light transmission blocking pattern 571 may include a light reflecting material. The light reflecting material may be a metal having excellent reflectivity such as silver (Ag) or a white resin having excellent reflectivity. As another example, the light transmission blocking pattern 571 may have a structure in which a plurality of layers having different refractive indexes are laminated as in a reflective polarizing film. The light transmission blocking pattern 571 may be directly deposited or coated on the light guide plate 510. As another example, the light transmission blocking pattern 571 may be attached via a bonding layer to a separate member.

In another embodiment, the light transmission blocking pattern 571 may include a light absorbing material such as a black pigment or a dye, and may be coated directly on the light guide plate 510 or attached through an adhesive layer.

A light transmission opening OP may be formed in the light transmission blocking pattern 571. The light transmission opening OP overlaps the light shielding resin 300 and provides a path through which ultraviolet light UV irradiated downward in the curing process of the light shielding resin 300 is transmitted. Therefore, even if the light transmission blocking pattern 571 is formed of a light reflecting material or a light absorbing material, the ultraviolet light irradiated from the lower side of the optical member 501 may be provided to the light shielding resin 300 via the light guide plate 510 and the light transmission opening OP. Thus, the curing of the light shielding resin 300 can be performed more smoothly.

The light shielding resin 300 may be disposed on the light transmission blocking pattern 571 and may be in contact with the light transmission blocking pattern 571. Further, the light shielding resin 300 may further contact the light guide plate 510 exposed through the light transmission opening OP.

Figure 22:
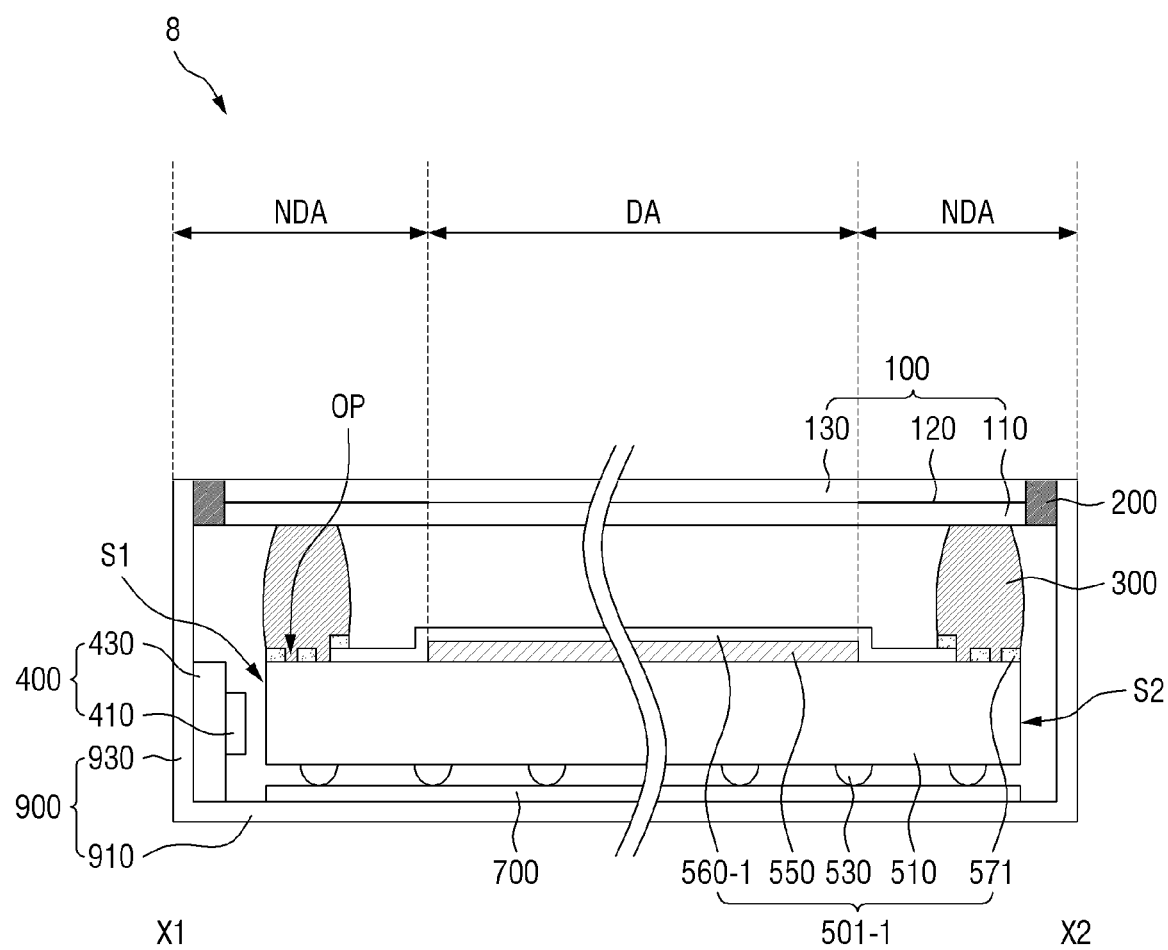
FIG. 22 is a cross-sectional view of a display device according to still another embodiment taken along line X1-X2 of FIG. 1.
Figure 23:
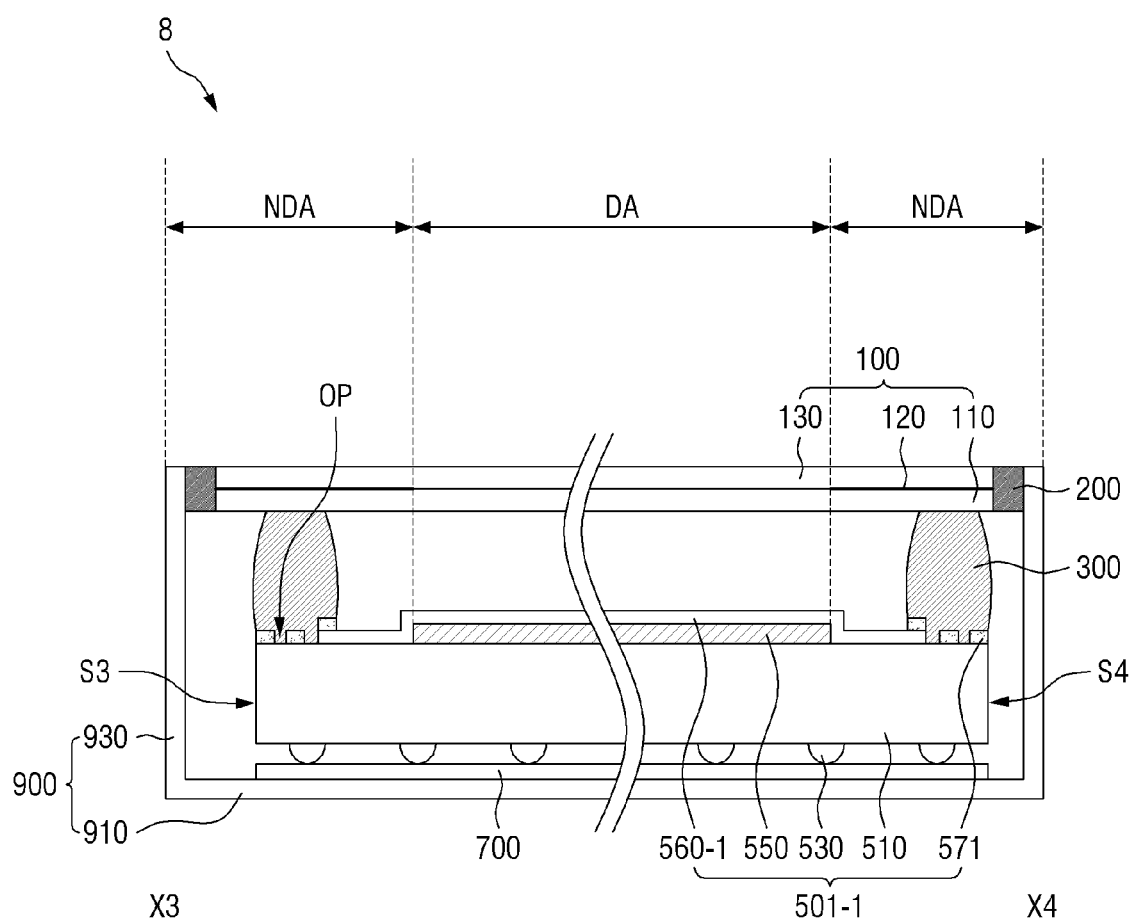
FIG. 23 is a cross-sectional view of a display device according to still another embodiment taken along line X3-X4 of FIG. 1.

FIG. 22 is a cross-sectional view of a display device according to still another embodiment taken along line X1-X2 of FIG. 1. FIG. 23 is a cross-sectional view of a display device according to still another embodiment taken along line X3-X4 of FIG. 1.

Referring to FIGS. 22 and 23, a display device 8 according to the present embodiment is different from the display device 7 described above with reference to FIGS. 21 to 22 in that the passivation layer 560-1 is partially extended to contact the light transmission blocking pattern 571 and a portion of the light transmission blocking pattern 571 is disposed on the passivation layer 560-1, and the other configurations are substantially the same or similar. Thus, a redundant description will be omitted and differences are mainly described.

The passivation layer 560-1 may extend toward the light transmission blocking pattern 571 to contact the light transmission blocking pattern 571. Further, a portion of the passivation layer 560-1 may be disposed below the light transmission blocking pattern 571. That is, at least a portion of the light transmission blocking pattern 571 may be disposed on the passivation layer 560-1. Although it is illustrated in the drawing that the light transmission opening OP formed in the light transmission blocking pattern 571 and the passivation layer 560-1 do not overlap each other, this is merely exemplary. In another embodiment, the passivation layer 560-1 may overlap the light transmission opening OP.

The light shielding resin 300 may be in contact with the light guide plate 510 exposed through the light transmission blocking pattern 571 and the light transmission opening OP as described above. In another embodiment, when the passivation layer 560-1 overlaps the light transmission opening OP, the light shielding resin 300 may contact the passivation layer 560-1 exposed through the light transmission opening OP.

Figure 24:
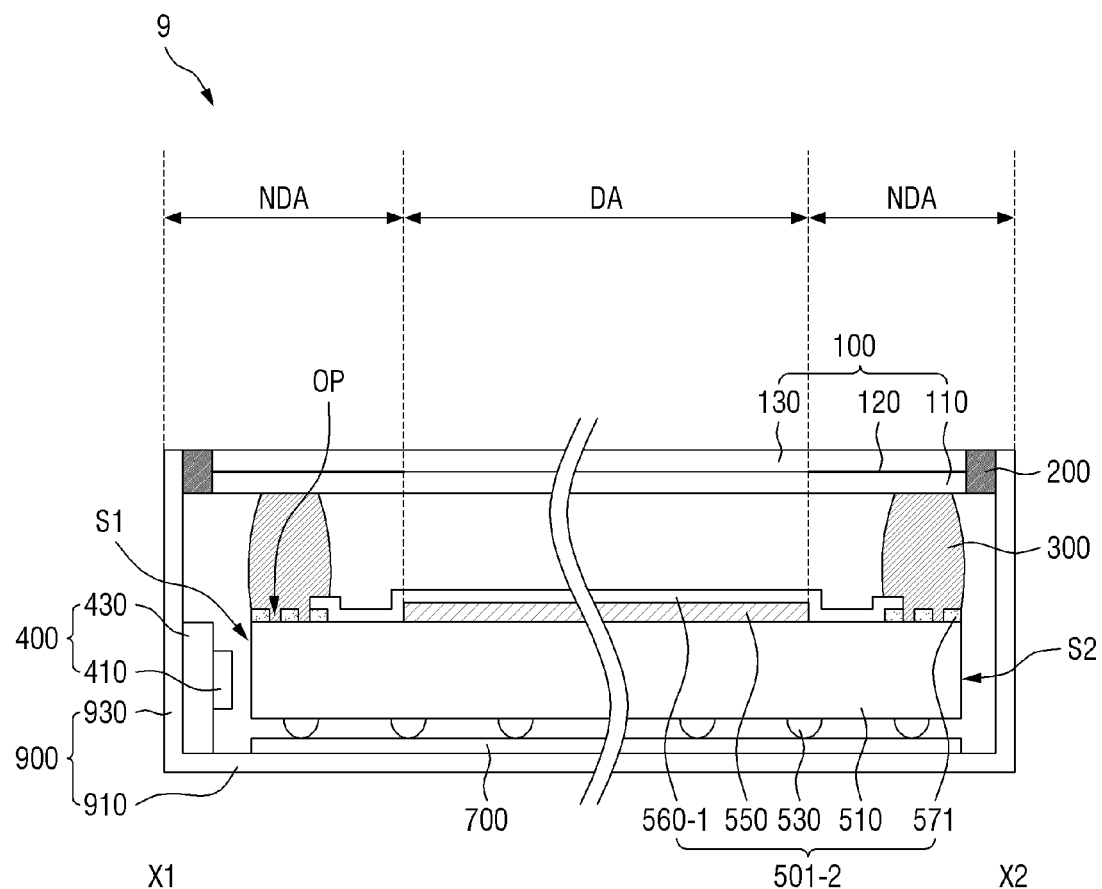
FIG. 24 is a cross-sectional view of a display device according to still another embodiment taken along line X1-X2 of FIG. 1.
Figure 25:
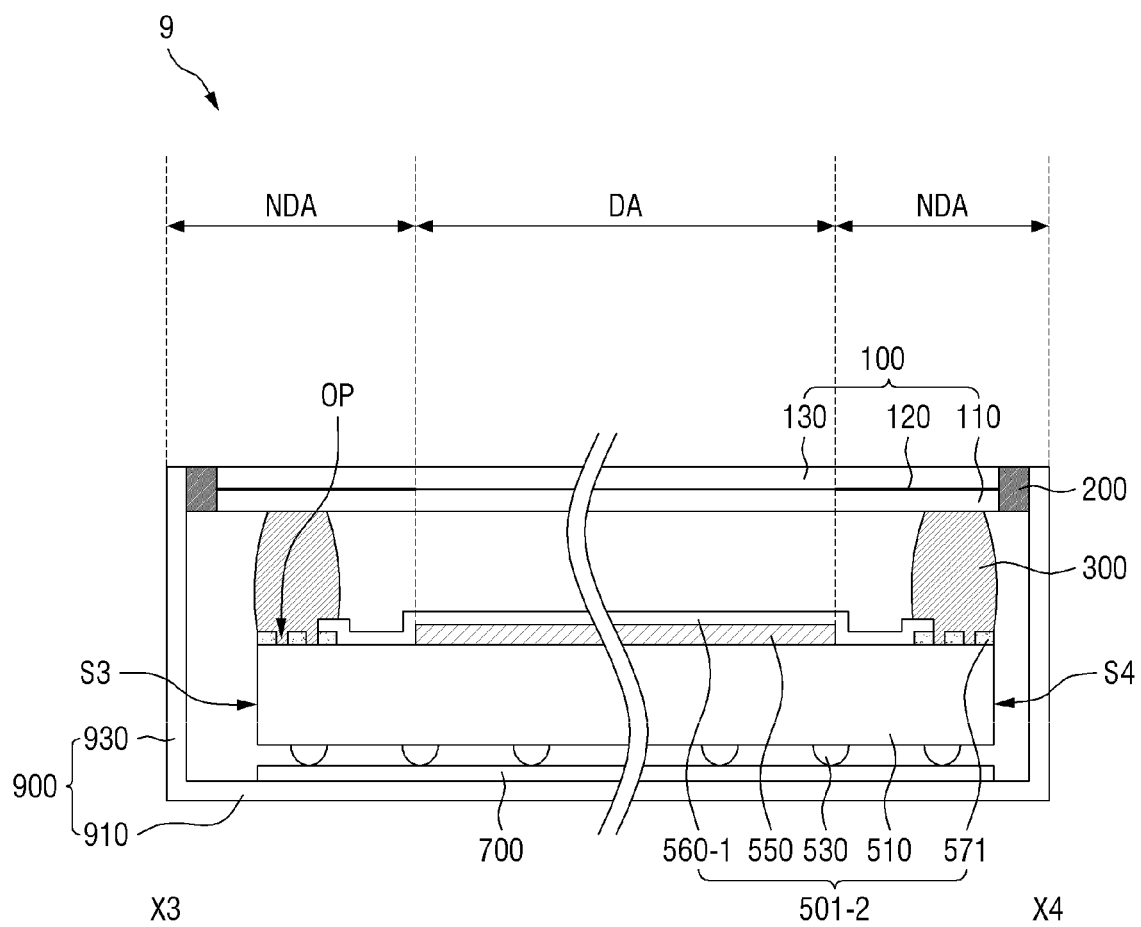
FIG. 25 is a cross-sectional view of a display device according to still another embodiment taken along line X3-X4 of FIG. 1.

FIG. 24 is a cross-sectional view of a display device according to still another embodiment taken along line X1-X2 of FIG. 1. FIG. 25 is a cross-sectional view of a display device according to still another embodiment taken along line X3-X4 of FIG. 1.

Referring to FIGS. 24 and 25, a display device 9 according to the present embodiment is different from the display device 7 described above with reference to FIGS. 21 to 22 in that the passivation layer 560-1 is partially extended to contact the light transmission blocking pattern 571 and a portion of the light transmission blocking pattern 571 is disposed below the passivation layer 560-1, and the other configurations are substantially the same or similar.

The passivation layer 560-1 may extend toward the light transmission blocking pattern 571 to contact the light transmission blocking pattern 571. Further, a portion of the passivation layer 560-1 may be disposed on the light transmission blocking pattern 571. That is, at least a portion of the light transmission blocking pattern 571 may be disposed below the passivation layer 560-1.

The light shielding resin 300 may be disposed on the light transmission blocking pattern 571 and may be in contact with the light transmission blocking pattern 571 as described above. In addition, since a portion of the passivation layer 560-1 is disposed on the light transmission blocking pattern 571, the light shielding resin 300 may be in partial contact with the passivation layer 560-1.

The light shielding resin 300 may be in contact with the light guide plate 510 exposed through the light transmission opening OP. In another embodiment, when the passivation layer 560-1 overlaps the light transmission opening OP, the light guide plate 510 may not be exposed through the light transmission opening OP, and the passivation layer 560-1 may be disposed in the light transmission opening OP. In this case, the light shielding resin 300 may be in contact with the passivation layer 560-1 and may not be in contact with the light guide plate 510.

Figure 26:
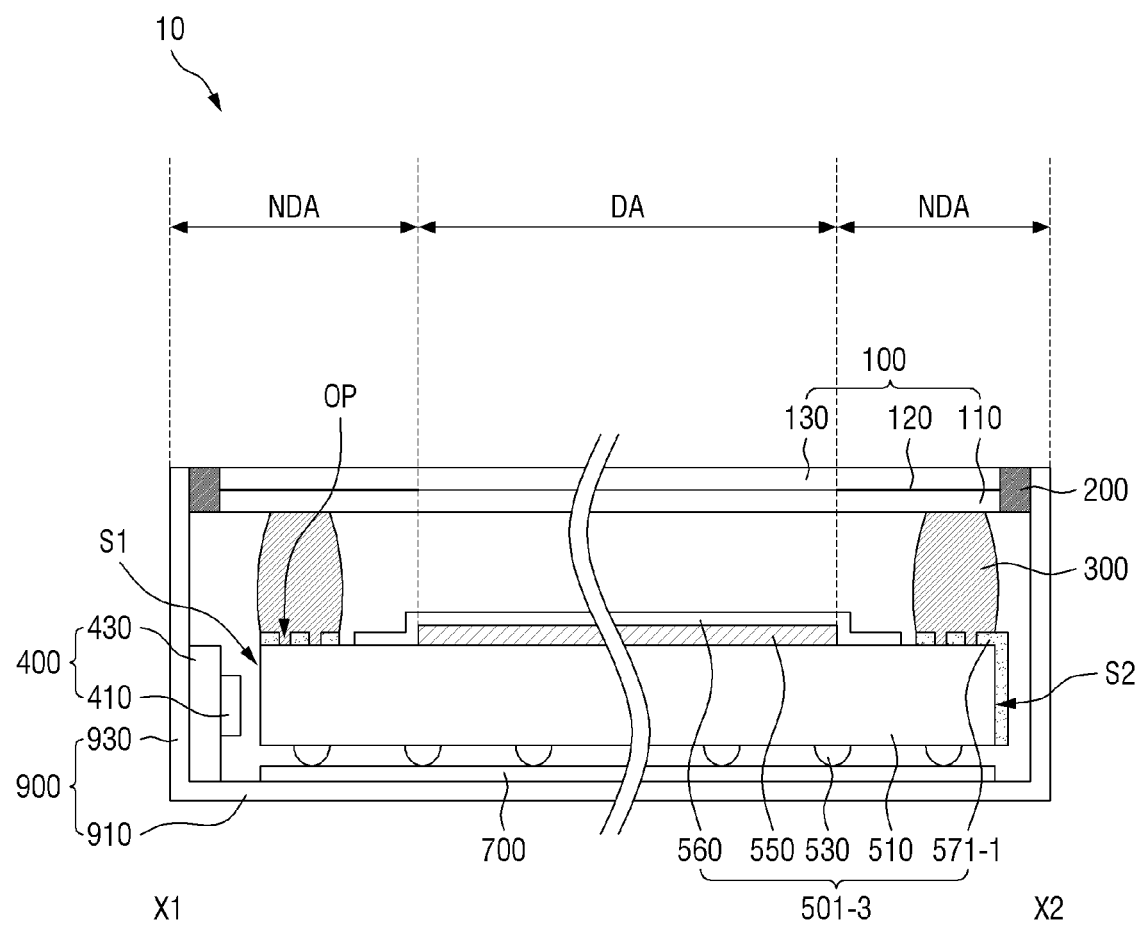
FIG. 26 is a cross-sectional view of a display device according to still another embodiment taken along line X1-X2 of FIG. 1.
Figure 27:
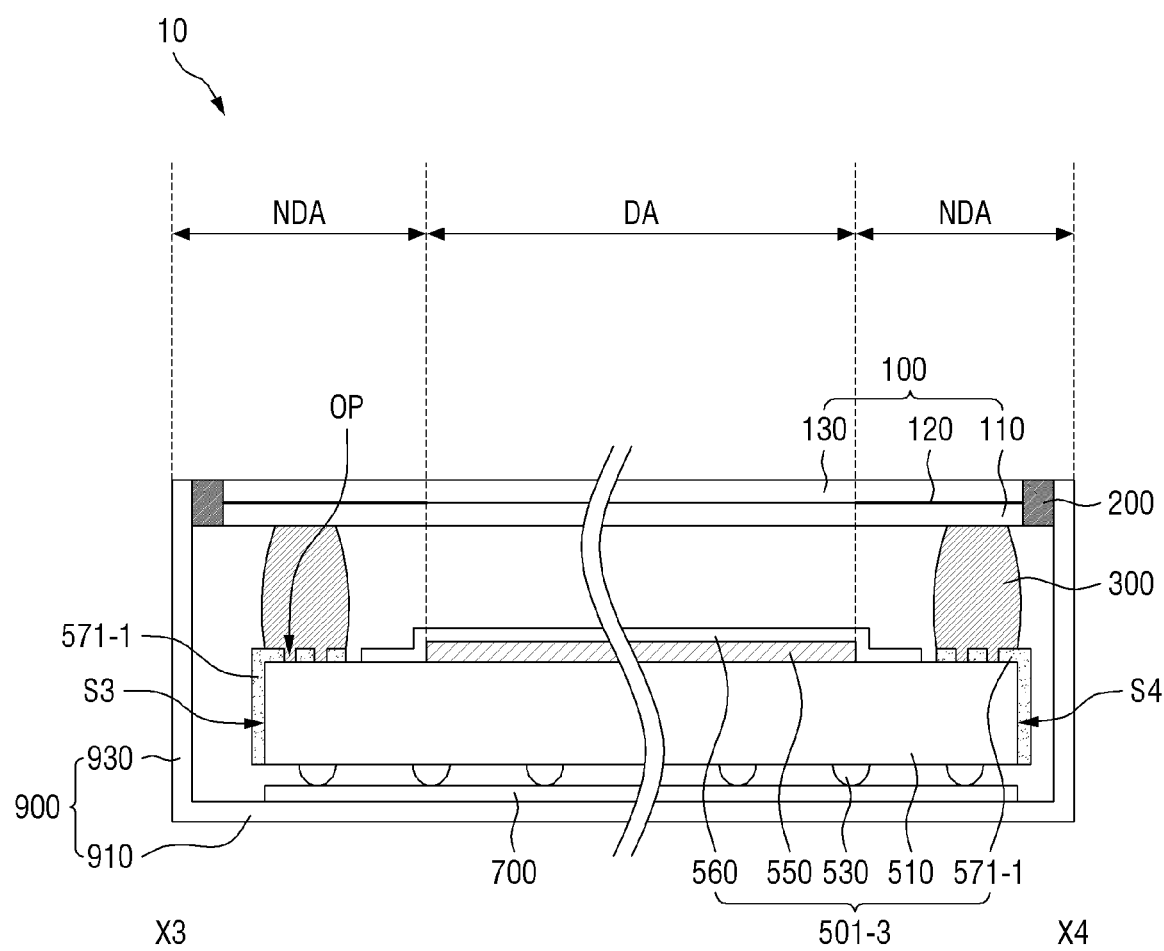
FIG. 27 is a cross-sectional view of a display device according to still another embodiment taken along line X3-X4 of FIG. 1.

FIG. 26 is a cross-sectional view of a display device according to still another embodiment taken along line X1-X2 of FIG. 1. FIG. 27 is a cross-sectional view of a display device according to still another embodiment taken along line X3-X4 of FIG. 1.

Referring to FIGS. 26 and 27, a display device 10 according to the present embodiment is different from the display device 7 described above with reference to FIGS. 20 and 21 only in a configuration of a light transmission blocking pattern 571-1, and the other configurations are substantially the same or similar.

The light transmission blocking pattern 571-1 of the display device 10 may further include a portion in contact with the second side surface S2 which is the light facing surface of the light guide plate 510 and covering the second side surface S2 in addition to a portion disposed along the upper edge of the light guide plate 510. Accordingly, the light leakage generated from the second side surface S2, which is the light facing surface of the light guide plate 510, can be blocked.

The light transmission blocking pattern 571-1 may further include portions in contact with the third side surface S3 and the fourth side surface S4 of the light guide plate 510 and covering the third side surface S3 and the fourth side surface S4, respectively. Accordingly, the light leakage generated from the third side surface S3 and the fourth side surface S4 of the light guide plate 510 can be blocked.

Figure 28:
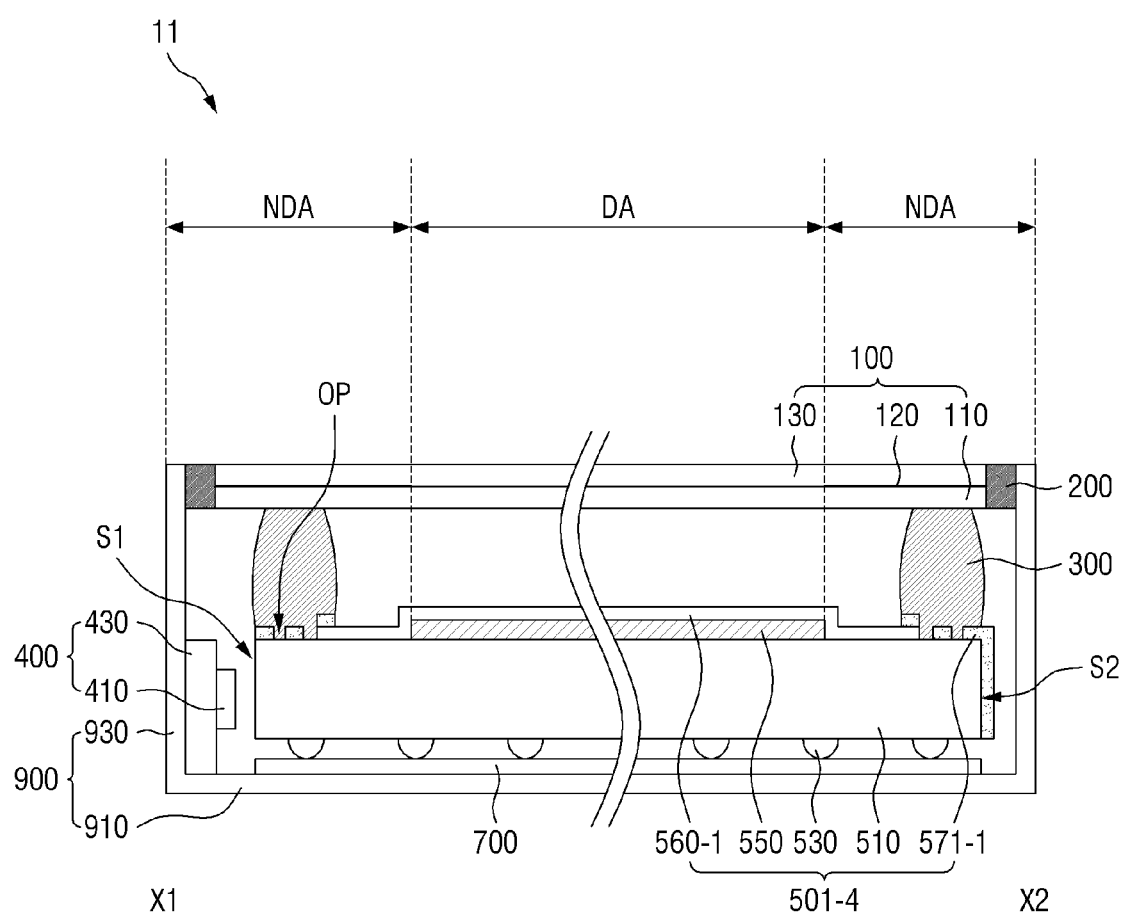
FIG. 28 is a cross-sectional view of a display device according to still another embodiment taken along line X1-X2 of FIG. 1.
Figure 29:
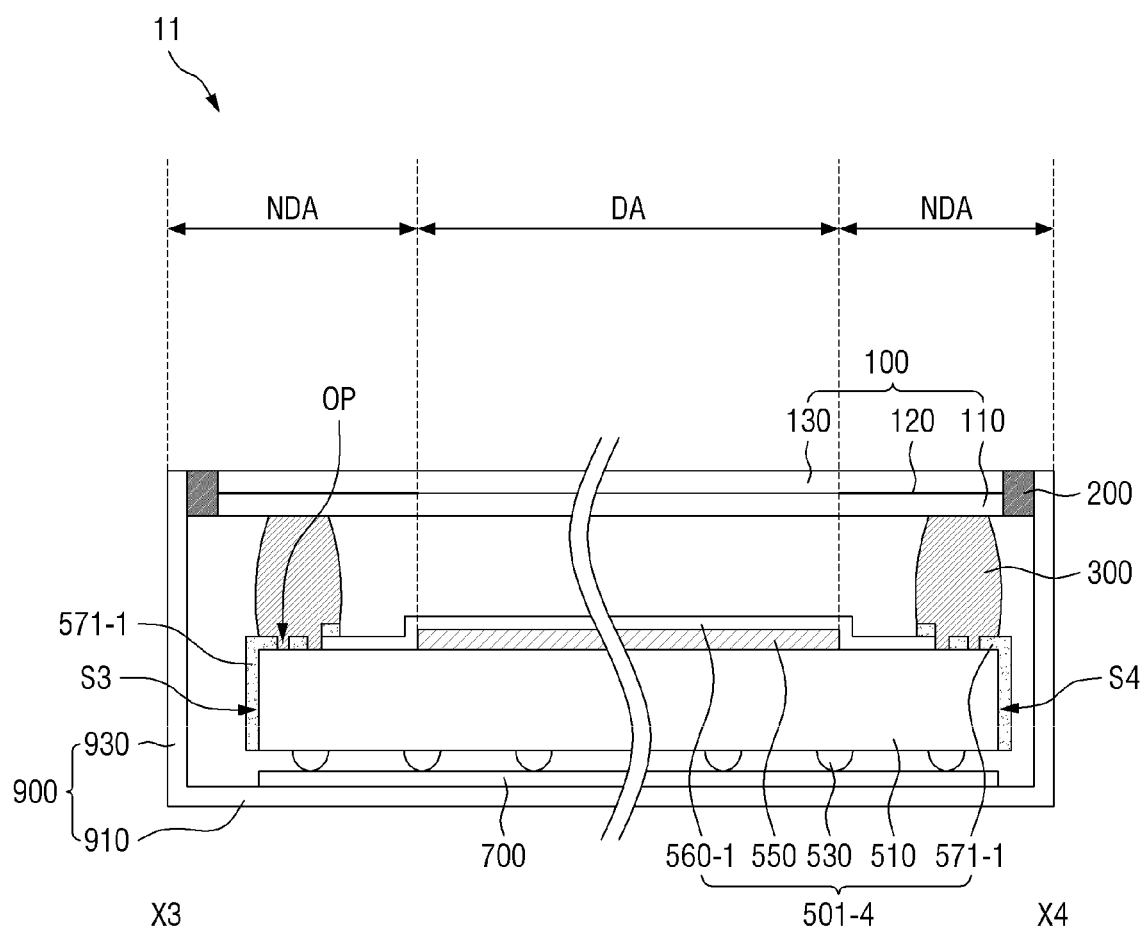
FIG. 29 is a cross-sectional view of a display device according to still another embodiment taken along line X3-X4 of FIG. 1.

FIG. 28 is a cross-sectional view of a display device according to still another embodiment taken along line X1-X2 of FIG. 1. FIG. 29 is a cross-sectional view of a display device according to still another embodiment taken along line X3-X4 of FIG. 1.

Referring to FIGS. 28 and 29, a display device 11 according to the present embodiment is different from the display device 8 described above with reference to FIGS. 22 and 23 only in a configuration of the light transmission blocking pattern 571-1, and the other configurations are substantially the same or similar. Since the other description of the light transmission blocking pattern 571-1 is the same as that described above with reference to FIGS. 26 and 27, it will be omitted.

Figure 30:
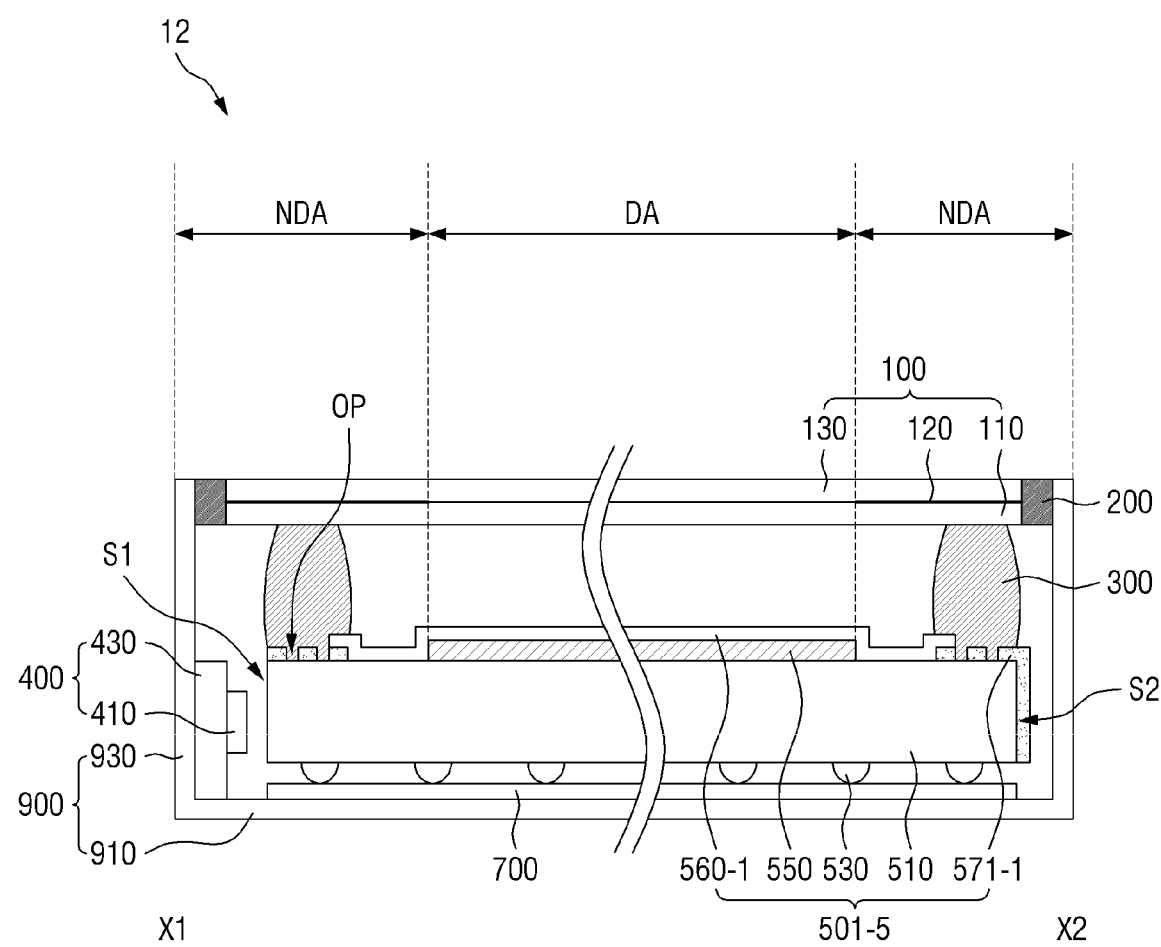
FIG. 30 is a cross-sectional view of a display device according to still another embodiment taken along line X1-X2 of FIG. 1.
Figure 31:
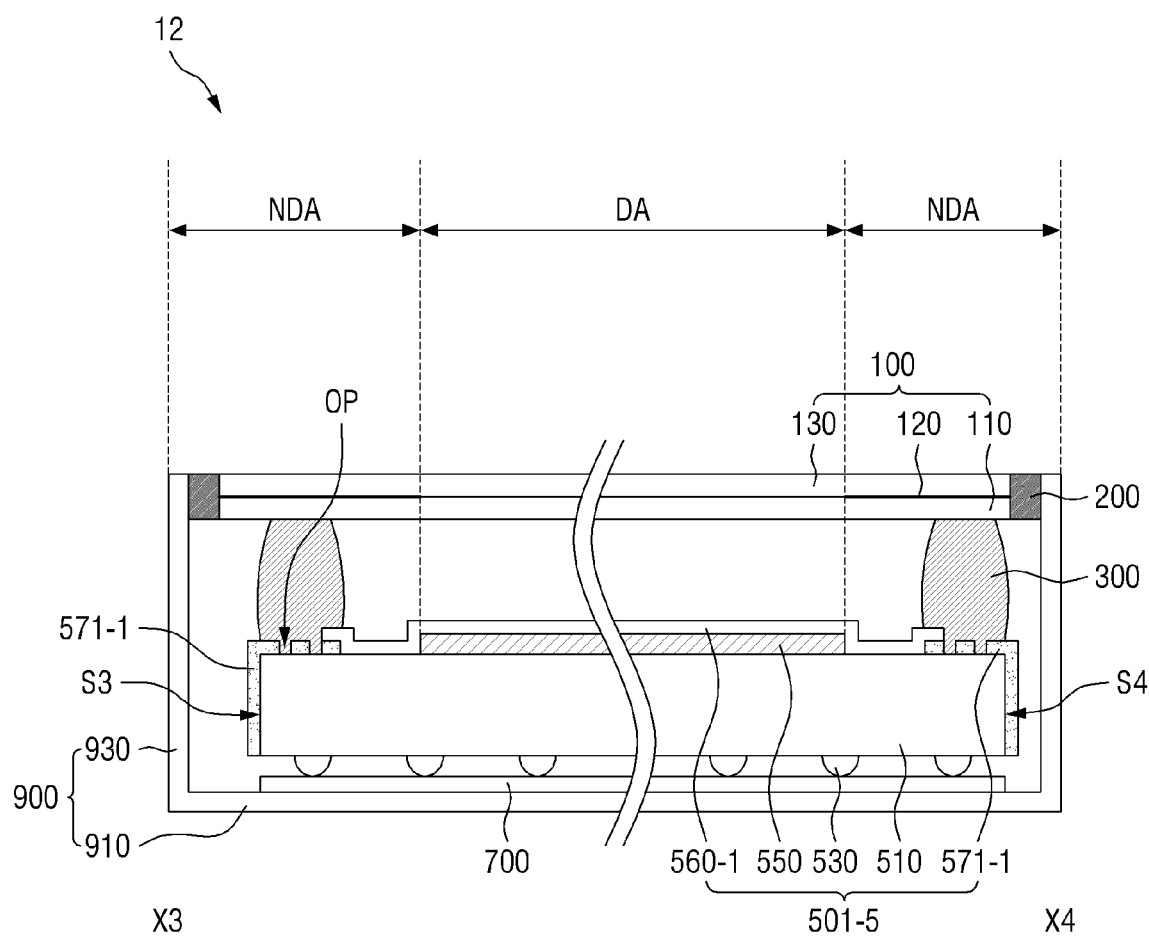
FIG. 31 is a cross-sectional view of a display device according to still another embodiment taken along line X3-X4 of FIG. 1.

FIG. 30 is a cross-sectional view of a display device according to still another embodiment taken along line X1-X2 of FIG. 1. FIG. 31 is a cross-sectional view of a display device according to still another embodiment taken along line X3-X4 of FIG. 1.

Referring to FIGS. 30 and 31, a display device 12 according to the present embodiment is different from the display device 9 described above with reference to FIGS. 24 to 25 only in a configuration of the light transmission blocking pattern 571-1, and the other configurations are substantially the same or similar. Since the other description of the light transmission blocking pattern 571-1 is the same as that described above with reference to FIGS. 26 and 27, it will be omitted.

In the display device according to the above-described embodiments, the light transmission blocking pattern may be configured to block visible light and transmit ultraviolet light, or the light transmission opening may be formed in the light transmission blocking pattern, thereby more smoothly performing the curing of the light shielding resin. Thus, there is an advantage that the reliability of the display device can be improved. Further, since the light leakage is prevented through the light transmission blocking pattern, there is an advantage that the display quality of the display device can be improved. In addition, since the optical member and the display panel are coupled to each other through the light shielding resin, there is an advantage that the display device can be made slim.

Although the embodiments have been described above, they are merely examples and not intended to limit the embodiments and it should be appreciated that various modifications and applications not described above may be made by one of ordinary skill in the art without departing from the essential features of the embodiment. For example, each of the components described in detail in the embodiments may be implemented in a modifiable manner. Also, differences related to such modifications and applications should be understood as being included in the scope of the present disclosure defined by the attached claims, and equivalents thereof.

What is claimed is:

1. A display device comprising:
    a light source;
    an optical member including
        a light guide plate, which has a first side surface facing the light source, and
        a light transmission blocking pattern, which is arranged along an edge of an upper surface of the light guide plate to transmit ultraviolet light and block visible light;
    a display panel on the optical member; and
    a light shielding resin between the optical member and the display panel and configured to overlap the light transmission blocking pattern and couple the optical member with the display panel.

2. The display device of claim 1, wherein the display panel includes a display area and a non-display area around the display area, and the light transmission blocking pattern overlaps the non-display area and does not overlap the display area.

3. The display device of claim 2, wherein the light transmission blocking pattern is arranged to surround the display area in a plan view and in a closed loop shape.

4. The display device of claim 1, wherein a pattern is on an upper surface of the light transmission blocking pattern.

5. The display device of claim 1, wherein the light transmission blocking pattern is in contact with the light guide plate and the light shielding resin.

6. The display device of claim 1, wherein the light guide plate includes a second side surface opposite to the first side surface, and the light transmission blocking pattern further includes a portion covering the second side surface.

7. The display device of claim 6, wherein the light guide plate further includes a third side surface connecting one end of the first side surface to one end of the second side surface and a fourth side surface connecting the other end of the first side surface to the other end of the second side surface, and the light transmission blocking pattern further includes a portion covering the third side surface and a portion covering the fourth side surface.

8. The display device of claim 1, further comprising:
    a wavelength conversion layer on the light guide plate; and
    a passivation layer on the wavelength conversion layer and covering a side surface of the wavelength conversion layer,
    wherein the light transmission blocking pattern is arranged to surround the wavelength conversion layer in a plan view.

9. The display device of claim 8, wherein the light source is a blue light source, and the wavelength conversion layer includes quantum dots.

10. The display device of claim 8, wherein the light transmission blocking pattern is in contact with the passivation layer.

11. The display device of claim 10, wherein the light shielding resin is in contact with the light transmission blocking pattern and the display panel and is not in contact with the light guide plate.

12. The display device of claim 8, wherein the passivation layer and the light guide plate include an inorganic material, and the passivation layer is in contact with the light guide plate.

13. A display device comprising:
a light source;
an optical member including
  a light guide plate, which has a first side surface facing the light source, and
  a light transmission blocking pattern, which is arranged along an edge of an upper surface of the light guide plate and includes a light absorbing material or a light reflecting material;
a display panel on the optical member; and
a light shielding resin between the optical member and the display panel and configured to couple the optical member with the display panel,
wherein a light transmission opening is in the light transmission blocking pattern to overlap the light shielding resin.

14. The display device of claim 13, wherein the light shielding resin is in contact with a portion of the light guide plate exposed through the light transmission opening.

15. The display device of claim 13, wherein the light guide plate includes a second side surface opposite to the first side surface, and the light transmission blocking pattern further includes a portion covering the second side surface.

16. The display device of claim 15, wherein the light guide plate further includes a third side surface connecting one end of the first side surface to one end of the second side surface and a fourth side surface connecting the other end of the first side surface to the other end of the second side surface, and the light transmission blocking pattern further includes a portion covering the third side surface and a portion covering the fourth side surface.

17. The display device of claim 13, further comprising:
a wavelength conversion layer on the light guide plate; and
a passivation layer on the wavelength conversion layer and covering a side surface of the wavelength conversion layer,
wherein the light transmission blocking pattern is arranged to surround the wavelength conversion layer in a plan view.

18. The display device of claim 17, wherein the light transmission blocking pattern is in contact with the passivation layer.

19. The display device of claim 18, wherein the light shielding resin is in contact with the light transmission blocking pattern, the passivation layer, the display panel, and a portion of the light guide plate exposed through the light transmission opening.

20. The display device of claim 17, wherein the passivation layer and the light guide plate include an inorganic material, and the passivation layer is in contact with the light guide plate.

* * * * *